US008273823B2

(12) United States Patent
Matyjaszewski et al.

(10) Patent No.: US 8,273,823 B2
(45) Date of Patent: Sep. 25, 2012

(54) ATOM TRANSFER RADICAL POLYMERIZATION IN MICROEMULSION AND TRUE EMULSION POLYMERIZATION PROCESSES

(75) Inventors: Krzysztof Matyjaszewski, Pittsburgh, PA (US); Ke Min, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 884 days.

(21) Appl. No.: 11/990,836

(22) PCT Filed: Aug. 23, 2006

(86) PCT No.: PCT/US2006/033152
§ 371 (c)(1),
(2), (4) Date: Jan. 16, 2009

(87) PCT Pub. No.: WO2007/025086
PCT Pub. Date: Mar. 1, 2007

(65) Prior Publication Data
US 2009/0176951 A1    Jul. 9, 2009

Related U.S. Application Data

(60) Provisional application No. 60/711,044, filed on Aug. 23, 2005, provisional application No. 60/816,546, filed on Jun. 26, 2006.

(51) Int. Cl.
*C08F 2/32* (2006.01)
*C08F 297/00* (2006.01)
*C08F 2/22* (2006.01)
*C08F 4/10* (2006.01)

(52) U.S. Cl. ........ 524/801; 524/832; 524/836; 525/243; 525/269; 526/135; 526/146; 526/147; 526/915; 528/482

(58) Field of Classification Search .................. 524/801, 524/832, 836; 525/243, 269; 526/135, 147; 526/915, 146; 528/482
See application file for complete search history.

(56) References Cited

U.S. PATENT DOCUMENTS

| | | | |
|---|---|---|---|
| 3,037,004 A | 5/1962 | Simone et al. |
| 3,096,312 A | 7/1963 | Henry |
| 3,183,217 A | 5/1965 | Serniuk et al. |
| 3,350,374 A | 10/1967 | Fetscher et al. |
| 3,397,186 A | 8/1968 | Edward et al. |
| 3,862,978 A | 1/1975 | Decker et al. |
| 3,959,225 A | 5/1976 | Kuntz |
| 3,963,491 A | 6/1976 | Marsh |
| 4,007,165 A | 2/1977 | MacLeay et al. |
| 4,073,870 A | 2/1978 | Saji et al. |
| 4,145,586 A | 3/1979 | Swann |
| 4,374,751 A | 2/1983 | Dudgeon |
| 4,384,093 A | 5/1983 | Culbertson et al. |
| 4,581,429 A | 4/1986 | Solomon et al. |
| 4,728,706 A | 3/1988 | Farnham et al. |
| 4,806,605 A | 2/1989 | Hertler |
| 4,940,648 A | 7/1990 | Geiger |
| 4,940,760 A | 7/1990 | Boettcher et al. |
| 4,954,416 A | 9/1990 | Wright et al. |
| 4,978,498 A | 12/1990 | Yoshihiro et al. |
| 5,026,813 A | 6/1991 | Meder |
| 5,089,135 A | 2/1992 | Yoneyama et al. |
| 5,102,967 A | 4/1992 | Meder |
| 5,169,914 A | 12/1992 | Kaszas et al. |
| 5,210,109 A | 5/1993 | Tateosian et al. |
| 5,212,043 A | 5/1993 | Yamamoto et al. |
| 5,248,746 A | 9/1993 | Shimokawa et al. |
| 5,254,651 A | 10/1993 | Alexanian et al. |
| 5,281,681 A | 1/1994 | Austin |
| 5,294,678 A | 3/1994 | Tse et al. |
| 5,312,871 A | 5/1994 | Mardare et al. |
| 5,322,912 A | 6/1994 | Georges et al. |
| 5,324,879 A | 6/1994 | Hawthorne |
| 5,331,088 A | 7/1994 | Meister et al. |
| 5,401,804 A | 3/1995 | Georges et al. |
| 5,405,913 A | 4/1995 | Harwood et al. |

(Continued)

FOREIGN PATENT DOCUMENTS

CA    2209061    2/1998

(Continued)

OTHER PUBLICATIONS

Li, et al, Further Progress in Atom Transfer Radical Polymerization Conducted in a Waterborne System, J. Poly. Sci.: Pt. A: Poly. Chem., vol. 41, 3606-3614 (2003).* Acar, et al., Macromolecules 2000, 33, 7700-7706.
Anderegg, et al., Helv. Chim. Acta 1977, 60, 123.
Annenkov et al., Poly-C-vinyltetrazoles: A New Type of Polyacid, Journal of Polymer Science Part A: Polymer Chemistry, 1993, pp. 1903-1906, vol. 31(7).
Ashford, et al., "First example of the atom transfer radical polymerisation of an acidic monomer: direct synthesis of methacrylic acid copolymers in aqueius media", Chemical Communications—Chemcom, Royal Society of Chemistry, GB (1999), pp. 1285-1286.
Asscher et al., Chlorine-Activation by Redox-Transfer, Part IV, The Addition of Sulphonyl Chlorides to Vinylic Monomers and Other Olefins, Journal of the Chemical Society, 1964, pp. 4962-4971.
Bamford, Comprehensive Polymer Science (First Supplement), eds., Pergamon: Oxford vol. 3., p. 123 (1991).
Baumann, et al., Macromolecular Materials and Engineering (2000), 280/281, 1-6.

(Continued)

*Primary Examiner* — Fred M Teskin
(74) *Attorney, Agent, or Firm* — K&L Gates LLP

(57) ABSTRACT

The invention is directed to a microemulsion polymerization comprising adding a polymerization catalyst precursor, such as a transition metal complex in the higher of two accessible oxidation states, an ATRP initiator, and an organic solvent to an aqueous solution to form an emulsion. Radically polymerizable monomers and a reducing agent may then be added to the emulsion. The reducing agent converts the catalyst precursor to a catalyst for polymerization of the first monomer from the initiator. In certain embodiments the organic solvent may comprise radically polymerizable monomers. The aqueous solution may comprise a surfactant. Further embodiments are directed to an ah initio polymerization process comprising adding a polymerization catalyst precursor; an ATRP initiator, and an organic solvent to an aqueous solution to form an emulsion, wherein the organic solvent comprises second radically polymerizable monomers, adding a reducing agent to convert the catalyst precursor to a catalyst for polymerization of the first radically polymerizable monomer from the initiator; and adding first radically polymerizable monomers to the emulsion.

63 Claims, 19 Drawing Sheets

U.S. PATENT DOCUMENTS

| | | | |
|---|---|---|---|
| 5,451,647 A | 9/1995 | Faust et al. |
| 5,470,928 A | 11/1995 | Harwood et al. |
| 5,506,312 A | 4/1996 | Arjunan |
| 5,508,353 A | 4/1996 | Liu et al. |
| 5,510,212 A | 4/1996 | Delnick et al. |
| 5,510,307 A | 4/1996 | Narayanan et al. |
| 5,558,954 A | 9/1996 | Morrison |
| 5,610,250 A | 3/1997 | Veregin et al. |
| 5,656,708 A | 8/1997 | Meister |
| 5,668,188 A | 9/1997 | Whinnery et al. |
| 5,700,844 A | 12/1997 | Hedrick et al. |
| 5,705,577 A | 1/1998 | Rossi et al. |
| 5,708,102 A | 1/1998 | Fryd et al. |
| 5,763,548 A | 6/1998 | Matyjaszewski et al. |
| 5,767,210 A | 6/1998 | Lecomte et al. |
| 5,773,538 A | 6/1998 | Feiring |
| 5,789,487 A | 8/1998 | Matyjaszewski et al. |
| 5,807,937 A | 9/1998 | Matyjaszewski et al. |
| 5,811,500 A | 9/1998 | Dubois et al. |
| 5,833,320 A | 11/1998 | Kaneko et al. |
| 5,854,364 A | 12/1998 | Senninger et al. |
| 5,886,118 A | 3/1999 | Percec |
| 5,891,971 A | 4/1999 | Keoshkerian et al. |
| 5,910,549 A | 6/1999 | Matyjaszewski et al. |
| 5,945,491 A | 8/1999 | Matyjaszewski et al. |
| 5,998,537 A | 12/1999 | Good et al. |
| 6,054,507 A | 4/2000 | Funaki et al. |
| 6,057,042 A | 5/2000 | Shimotsu |
| 6,083,524 A | 7/2000 | Sawhney et al. |
| 6,111,022 A | 8/2000 | Matyjaszewski et al. |
| 6,114,448 A | 9/2000 | Derbes |
| 6,114,482 A | 9/2000 | Senninger et al. |
| 6,121,371 A | 9/2000 | Matyjaszewski et al. |
| 6,124,411 A | 9/2000 | Matyjaszewski et al. |
| 6,126,919 A | 10/2000 | Stefely et al. |
| 6,143,848 A | 11/2000 | Lee et al. |
| 6,162,882 A | 12/2000 | Matyjaszewski et al. |
| 6,191,197 B1 | 2/2001 | Wang et al. |
| 6,254,854 B1 | 7/2001 | Edwards et al. |
| 6,255,448 B1 | 7/2001 | Grimaldi et al. |
| 6,288,186 B1 | 9/2001 | Matyjaszewski et al. |
| 6,310,149 B1 | 10/2001 | Haddleton |
| 6,326,455 B2 | 12/2001 | Vassiliou et al. |
| 6,407,187 B1 | 6/2002 | Matyjaszewski et al. |
| 6,512,060 B1 | 1/2003 | Matyjaszewski et al. |
| 6,534,610 B1 | 3/2003 | Wilson et al. |
| 6,538,091 B1 | 3/2003 | Matyjaszewski et al. |
| 6,541,580 B1 | 4/2003 | Matyjaszewski et al. |
| 6,545,095 B1 | 4/2003 | Solomon et al. |
| 6,565,763 B1 | 5/2003 | Asakawa et al. |
| 6,592,991 B1 | 7/2003 | Wiesner et al. |
| 6,624,262 B2 | 9/2003 | Matyjaszewski et al. |
| 6,624,263 B2 | 9/2003 | Matyjaszewski et al. |
| 6,627,314 B2 | 9/2003 | Matyjaszewski et al. |
| 6,670,299 B1 | 12/2003 | Marks et al. |
| 6,672,717 B2 | 1/2004 | Smith |
| 6,686,432 B2 | 2/2004 | Coca et al. |
| 6,692,914 B1 | 2/2004 | Klaerner et al. |
| 6,737,488 B2 | 5/2004 | Vanhoorne et al. |
| 6,759,491 B2 | 7/2004 | Matyjaszewski et al. |
| 6,784,247 B2 | 8/2004 | Rechenberg et al. |
| 6,784,248 B2 | 8/2004 | Coca et al. |
| 6,790,919 B2 | 9/2004 | Matyjaszewski et al. |
| 6,828,025 B2 | 12/2004 | Ali et al. |
| 6,887,962 B2 | 5/2005 | Matyjaszewski et al. |
| 7,018,655 B2 | 3/2006 | Lele et al. |
| 7,019,082 B2 | 3/2006 | Matyjaszewski et al. |
| 7,037,992 B2 | 5/2006 | Wilson et al. |
| 7,049,373 B2 | 5/2006 | Matyjaszewski et al. |
| 7,056,455 B2 | 6/2006 | Matyjaszewski et al. |
| 7,064,151 B1 | 6/2006 | Berge et al. |
| 7,064,166 B2 | 6/2006 | Matyjaszewski et al. |
| 7,105,579 B2 | 9/2006 | Adam et al. |
| 7,125,938 B2 | 10/2006 | Matyjaszewski et al. |
| 7,157,530 B2 | 1/2007 | Matyjaszewski et al. |
| 7,332,550 B2 | 2/2008 | Matyjaszewski et al. |
| 7,572,874 B2 | 8/2009 | Matyjaszewski et al. |
| 7,678,869 B2 | 3/2010 | Matyjaszewski et al. |
| 7,795,355 B2 | 9/2010 | Matyjaszewski et al. |
| 2003/0236361 A1 | 12/2003 | Yeager et al. |
| 2004/0044152 A1 | 3/2004 | Matyjaszewski et al. |
| 2004/0127634 A1* | 7/2004 | Parker et al. .................. 524/571 |
| 2004/0171779 A1 | 9/2004 | Matyjaszewski et al. |
| 2004/0204556 A1 | 10/2004 | Matyjaszewski et al. |
| 2005/0090632 A1 | 4/2005 | Matyjaszewski et al. |
| 2006/0258826 A1 | 11/2006 | Matyjaszewski et al. |
| 2007/0106012 A1 | 5/2007 | Matyjaszewski et al. |
| 2007/0155926 A1 | 7/2007 | Matyjaszewski et al. |
| 2007/0244265 A1 | 10/2007 | Matyjaszewski et al. |
| 2007/0276101 A1 | 11/2007 | Matyjaszewski et al. |
| 2009/0171024 A1 | 7/2009 | Jakubowski et al. |
| 2009/0312505 A1 | 12/2009 | Matyjaszewski et al. |

FOREIGN PATENT DOCUMENTS

| | | |
|---|---|---|
| CN | 1165828 A | 11/1997 |
| EP | 0265091 A1 | 4/1988 |
| EP | 0341012 A2 | 11/1989 |
| EP | 0434438 A | 6/1991 |
| EP | 0457916 A | 11/1991 |
| EP | 0789036 A1 | 8/1997 |
| EP | 0816385 A1 | 1/1998 |
| EP | 0824110 A1 | 2/1998 |
| EP | 0824111 A1 | 2/1998 |
| EP | 0826698 A1 | 3/1998 |
| EP | 0832902 A2 | 4/1998 |
| EP | 0870809 A2 | 10/1998 |
| EP | 0872493 A | 10/1998 |
| EP | 0879832 A1 | 11/1998 |
| EP | 0947527 A1 * | 6/1999 |
| EP | 1386935 A | 2/2004 |
| EP | 1469020 A | 10/2004 |
| EP | 1555273 A1 | 7/2005 |
| JP | 6322171 A | 11/1994 |
| WO | WO 88/00603 A3 | 1/1988 |
| WO | WO 94/13706 A | 6/1994 |
| WO | WO 97/18247 | 5/1997 |
| WO | WO 97/47661 A1 | 12/1997 |
| WO | WO 98/01480 | 1/1998 |
| WO | WO 98/06758 A1 | 2/1998 |
| WO | WO 98/20050 A2 | 5/1998 |
| WO | WO 99/28352 A | 6/1999 |
| WO | WO 00/47634 A1 | 8/2000 |
| WO | WO 00/56795 A1 | 9/2000 |
| WO | WO 00/75198 | 12/2000 |
| WO | WO 01/77197 A3 | 10/2001 |
| WO | WO 03/097107 A | 11/2003 |
| WO | WO 2004/041972 A | 5/2004 |
| WO | WO 2004/060928 A | 7/2004 |
| WO | WO 2005/056621 A1 | 6/2005 |
| WO | WO 2007/025086 A2 | 3/2007 |
| WO | WO 2007/059350 A2 | 5/2007 |
| WO | WO 2008/057163 A2 | 5/2008 |
| WO | WO 2008/148000 A1 | 12/2008 |
| WO | WO 2009/023353 A9 | 2/2009 |
| WO | WO 2009/111725 A1 | 9/2009 |

OTHER PUBLICATIONS

Bellus, Pure & Appl. Chem. 57, 1827 (1985).
Bledzki, et al., Makromol. Chem. 184, 745 (1983).
Braunecker, et al., Macromolecules 2005, 38, 4081.
Braunecker, et al., Organometal Chem. 2005, 690, 916.
Brittain et al., Makromol. Chem., Macromol. Symp. 67, pp. 373-386 (1993), "Termination Processes in Group Transfer Polymerization".
Buback, et al. (1995) Macromol. Chem. Phys. 196, 3267-80.
Buback, et al. (2002) Macromol. Chem. Phys. 203, 2570-2582.
Bywater, Makromol. Chem., Macromol. Symp. 67, pp. 339-350 (1993), "Group Transfer Polymerization—A Critical Overview".
Carnahan et al., Synthesis and Characterization of Poly(glycerol-succinic acid) Dendrimers, Macromolecules, 2001, pp. 7648-7655, vol. 34(22).
Carter et al., Polyimide Nanofoams From Phase-Separated Block Copolymers, Electrochemical Society Proceedings, 1997, pp. 32-43, vol. 97(8), Electrochemical Society, Pennington, NJ, US.
Caruso, Nanoengineering of Particle Surfaces—Adv. Mater. 2001, 13, No. 1, Jan. 5, 11-22—Wiley—VCH Verlag GmbH.D-69469 Weinheim, 2001.

Catala, et al., Macromolecules, 1995, 28, 8441.
Chemical Abstracts, vol. 85, 1976, pp. 20.
Chen et al., Pryolytic Behavior and In-Situ Paramagnetism of Star-like C60(CH3)×(PAN)xcopolymers, European Polymer Journal, 1998, pp. 421-429, vol. 34(3-4), Elsevier Science Ltd., Oxford, GB.
Coca et al., Polymerization of Acrylates by Atom Transfer Radical Polymerization. Homopolymerization of 2-Hydroxyethyl Acrylate, Journal of Polymer Science, Part A: Polymer Chemistry, 1998, pp. 1417-1424, vol. 36.
Cohen, et al., Inorg. Chem. 13, 2434 (1974).
Collman et al., "Clicking" Functionality onto Electrode Surfaces, Langmuir, 2004, pp. 1051-1053, vol. 20.
Hsieh et al., "Chapter 10—Copolymerization" in Anionic Polymerization: Principles and Practical Applications, Marcel Dekker, New York, 1996, pp. 237-257.
Curran, et al., Comprehensive Organic Synthesis, eds., Pergamon: Oxford vol. 4, p. 715 (1991).
Curran, et al., J. Am. Chem. Soc. 116, 4279 (1994).
Curran, et al., J. Org. Chem., 54, 3140 (1989).
Curran, Synthesis, 489 (1988).
Darkow et al., "Synthesis, Photomodification and Characterization of Homo- and Copolymers with 2,5-bisaryltetrazolyl Pendant Groups", Reactive and Functional Polymers, 1997, pp. 195-207, vol. 32(2).
Davies, "Reactions of L-ascorbic acid with transition metal complexes," Polyhedron, 1992, 11, 285-321.
De Vries, et al., "The Effect of Reducing Monosaccharides on the Atom Transfer Radical Polymerization of Butyl Methacrylate," Macromol. Chem. Phys., 2001, 202, 1645-1648.
Demko et al., A Click Chemistry Approach to Tetrazoles by Huisgen 1,3-Dipolar Cycloaddition: Synthesis of 5-Acyltetrazoles from Azides and Acyl Cyanides, Angewandte Chemie, International Edition, 2004, pp. 2113-2116, vol. 41(12).
Desmarquest, et al., Electrochim. Acta (1968), 13, 1109-1113.
Dreezen, et al., "Nano-Structured Polymer Blends: Phase Structure, Crystallisation Behaviour and Semi-Crystalline Morphology of Phase Separated Binary Blends of Poly(ethyleneoxide) and Poly(ether sulphone)", Polymer, Elsevier Science Publishers B.V., GB, vol. 41, No. 4, Feb. 2000, pp. 1395-1407.
Druliner, Macromolecules, 24, 6079 (1991).
Endo, et al., Macromolecules, 25, 5554 (1992).
Feng, "(Synthesis and Free Radical Polymerization of 2-oxo-3-methylene-5-phenyl-1,4-dioxan". Chinese Journal of Polymer Science, 1993, 11, 2, pp. 153-157).
Fischer, et al., Acc. Chem. Res. 20, 200-206 (1987).
Fischer, H., Chem. Rev. 2001, 101, 3581-3610.
Frackowiak, et al., "Supercapacitor electrodes from multiwalled carbon nanotubes", Applied Physics Letters, 77, pp. 2421-2423 (2000).
Fukuda, et al, Chem. Letters, 1996, 4, 293.
Fukuda, et al., Macromolecules, 1996, 29, 3050.
Gabaston, et al., "Synthesis of water soluble homopolymers and block copolymers by living free-radical polymerization", Polymr Preprints (American Chemical Society, Division of Polymer Chemistry), 38(1), pp. 719-720 (1997).
Gaynor, et al., Polym. Prep. (Am. Chem. Soc. Polym. Chem. Div.), 36(1), 467 (1995).
Georges, et al., Macromolecules 1993, 26, 2987.
Georges, et al., Macromolecules 1994, 27, 7228.
Georges, et al., Macromolecules, 1993, 26, 5316.
Gilbert & Williams, Reactivity Ratios of Conjugated Dienes Copolymerized in Emulsion at 5°, J. Am. Chem. Soc. 74, (1952), pp. 4114-4118.
Gnanou et al., "Effect of Phenol and Derivatives on Atom Transfer Radical Polymerization in the Presence of Air," Journal Polymer Science, Part A: Polymer Chemistry, 2004, 42, 351-359.
Granel et al., Controlled Radical Polymerization of Methacrylic Monomers in the Presence of Bis(ortho-chelated) Arylnickel (II) Complex and Different Activated Alkyl Halides, Macromolecules, 1996, pp. 8576-8582, vol. 29(27).
Grayson et al., Convergent Dendrons and Dendrimers: From Synthesis to Applications, Chemical Reviews, 2001, pp. 3819-3867, vol. 101(12).
Greszta et al., Gradient Copolymers of Styrene and Acrylonitrille Via Atom Transfer Radical Polymerization, Polymer Preprints, 1997, pp. 709-710, vol. 38(1).
Greszta, et al., Macromolecules, 27, 638 (1994).
Gromada et al., Simultaneous Reverse and Normal Initiation in Atom Transfer Radical Polymerization, Macromolecules, 2001, pp. 7664-7671, 34(22).
Haddleton, et al., "Copper-mediated living radical polymerization utilizing biological and end group modified poly(ethylene-co-butylene) macroinitiators", ACS Symposium Series, 768, (Controlled/Living Radical Polymerization), pp. 182-196 (2000).
Hawker, "Molecular Weight Control by a Living Free Radical Polymerization Process", Journal American Chem. Society, 1994, vol. 116, pp. 11185-11186.
Hawker, et al., Macromolecules, 1996, 29, 2686.
Hayes, et al., J. Am. Chem. Soc. 110, 5533 (1988).
Hedrick et al., (Dendrimer-like Star Block and Amphiphlic Copolymers by Combination of Ring Opening and Atom Transfer Radicat Polymerization. Macromolecules, 1998, 31, 8671-8705.
Helms et al., Dendronized Linear Polymers via "Click Chemistry", Journal of the American Chemical Society, 2004, pp. 15020-15021, vol. 126(46).
Heuts et al., "Atom transfer radical polymerization in the presence of a thiol: more evidence supporting radical intermediates," Macromol. Chem. Phys., 1999, 200, 1380-1385.
Hirao, et al., J. Synth. Org. Chem. (Japan), 52(3), 197 (1994).
Hirao, et al., Syn. Lett. 217 (1990).
Hong, et al., "Synthesis of water-soluble fluorine-containing block copolymers by atom transfer radical polymerization", 25(4), 302 (2001).
Hovestad, et al., Macromolecules 2000, 33, 4048-4052.
Ihre et al., Fast and Convenient Divergent Synthesis of Aliphatic Ester Dendrimers by Anhydride Coupling, Journal of the American Chemical Society, 2001, pp. 5908-5917, vol. 123(25).
Iqbal, et al., Chem. Rev. 94, 519 (1994).
Jakubowski et al., "Activators Regenerated by Electron Transfer for Atom Transfer Radical Polymerization of Styrene," Macromolecules, 2006, 39, 39-45.
J-F Lutz et al,. Synthesis and Properties of Copolymers with Tailored Sequence Distribution by Controlled/Living Radical Polymerization, in ACS Symposium Series, Advances in Controlled/living Radical Polymerizations, American Chemical Society Division of Polymer Chemistry, 2003, Chapter 19, pp. 268-282, vol. 854.
Jo et al., Effects of Various Copper Salts and Additives on Polymerization of Acrylonitrile by Atom Transfer Radical Polymerization, Polymer Preprints, 1997, pp. 699-700, vol. 38(1).
Jo et al., Polyacrylonitrile with Low Polydispersities by Atom Transfer Radical Polymerization, Polymer Preprints, 1997, pp. 697-698, vol. 38(1).
Kamigata, et al., Novel Perfluoroalkylation of Alkenes with Perfluoroalkanesulphonyl Chlorides Catalysed by a Ruthenium (II) Complex, Journal of the Chemical Society, Perkins Transactions 1, 1991, pp. 627-633.
Kato, et al., Macromolecules, 28, 1721 (1995).
Kawaguchi, et al., "Dispersion Polymerization", in Polymer Particles, Masayoshi Okubo, ed., Adv. Polym. Sci., 2005, 175, 299-328.
Kizhnyaev et al., Vinyltetrazoles: Synthesis and Properties, Russian Chemical Reviews, 2003, pp. 143-164, vol. 72(2).
Kolb et al., Click Chemistry: Diverse Chemical Function from a Few Good Reactions, Angewandte Chemie, International Edition, 2001, pp. 2004-2021, vol. 40(11).
Kosower, E.M., Acc Chem. Res. (1971), 4, 193-198.
Kowalewski et al., Advances in Nanostructured Carbons from Block Copolymers Prepared by Controlled Radical Polymerization Techniques, in Controlled Radical Polymerization: From Synthesis to Materials, American Chemical Society Division of Polymer Chemistry, 2005, Chapter 21, pp. 295-310, vol. 944.
Kwak et al., "ARGET ATRP of methyl methacrylate in the presence of nitrogen-based ligands as reducing agents," Polym. Int. 2009, 58, 242-247.
Lazzari, et al., Macromolecular Chemistry and Physics (2005), 206, 1382-1388.
Leduc et al., J. Am. Chem. Soc. 1996, 118, 11111-11118.

Lee, et al., "Synthesis of carboxylic acid functionalized nanoparticles by reversible addition-fragmentation chain transfer (RAFT) miniemulsion polymerization of styrene", Polymer, Elsevier Science Publishers B.V., GB, vol. 46, No. 11, pp. 3661-3668 (2005).

Lewis, et al., Copolymerization VII, Copolymerization of Some Further Monomer Pairs, Apr. 1948, pp. 1527-1529.

Li, et al., "Highly ordered carbon nanotube arrays for electronics applications", Applied Physics Letters, 75 pp. 367-369 (1999).

Li, et al., ASC Polym. Preprints, 1995, 36(1), 469.

Lingane, "Interpretation of the Polarographic Waves of Complex Metal Ions," Chem. Rev. 1941, 29, 1.

Liu et al., "Poly(N-isopropylacrylamide) hydrogels with improved shrinking kinetics by RAFT polymerization", Mar. 22, 2006, Polymer Elsevier Science Publishers, B.V., GB, pp. 2330-2336.

Majoral et al., Dendrimers Containing Heteroatoms (Si, P, B, Ge, or Bi), Chemical Reviews, 1999, pp. 845-880, vol. 99(3).

Makino et al., Controlled Atom Transfer Radical Polymerizations of Methyl Methacrylate Under Micellar Conditions, Polymer Preprints, 1988, pp. 288-289, vol. 39(1).

Mao, et al., "Controlled polymerizations of 2-(dialkylamino)ethyl methacrylates and their block copolymers in protic solvents at ambient temperature via ATRP", Journal of Polymer Science, Part A Polymer Chemistry, 42(20), pp. 5161-5169 (2004).

Maraval et al., "Lego" Chemistry for the Straightforward Synthesis of Dendrimer, Journal of Organic Chemistry, 2003, pp. 6043-6046, vol. 68(15).

Mardare, et al., ACS Polymer Preprints 35(1), 778 (1994).

Mardare, et al., Macromolecules, 27, 645 (1994).

Mardare, et al., Polym. Prep. (ACS), 36(1), 700-701 (1995).

Marestin et al., Nitroxide Mediated Living Radical Polymerization of Styrene in Emulsion, Macromolecules, 1998, pp. 4041-4044, vol. 31(12).

Matsumoto, et al., Synth. Commun. (1985) 15, 515.

Matthews et al., Dendrimers-Branching out from Curiosites into New Technologies, Progress in Polymer Science, 1998, pp. 1-56, vol. 23.

Matyjaszewski ed., Controlled/"Living" Radical Polymerization. Progress in ATRP, NMP, and RAFT, in: ACS Symposium Ser., 2000, Chapter 19, Reverse Atom Transfer Radical Polymerization Using AIBN or BPO as Initiator, pp. 263-275.

Matyjaszewski et al., (Structural Control of Poly(Methyl Methacrylate)-g-poly(Lactic Acid) Graft Copolymers by Atom Transfer Radical Polymerization (ATRP). Macromolecules 2001, 34, 6243-6248.

Matyjaszewski et al., "Controlled/Living Radical Polymerization. Kinetics of the Homogeneous Atom Transfer Radical Polymerization of Styrene," J. Am. Chem. Soc., 1997, 119, 674-680.

Matyjaszewski et al., Atom Transfer Radical Polymerization, Chemical Reviews, 2001, pp. 2921-2990, vol. 101(9).

Matyjaszewski et al., Controlled/"Living" Radical Polymerization of Styrene and Methly Methacrylate Catalyzed by Iron Complexes1, Macromolecules, 1997, pp. 8161-8164, vol. 30(26).

Matyjaszewski et al., Controlled/Living Radical Polymerization: State of the Art in 2002, in ACS Symposium Series, Advances in Controlled/living Radical Polymerizations, American Chemical Society Division of Polymer Chemistry, 2003, Chapter 1, pp. 2-9, vol. 854.

Matyjaszewski et al., Controlled/Living Radical Polymerization: State of the Art in 2005, in Controlled Radical Polymerization: From Synthesis to Materials, American Chemical Society Division of Polymer Chemistry, 2005, Chapter 1, pp. 2-12, vol. 944.

Matyjaszewski et al., Zerovalent Metals in Controlled/"Living" Radical Polymerization, Macromolecules, 1997, pp. 7348-7350, vol. 30(23).

Matyjaszewski, "The Importance of Exchange Reactions in the Controlled/Living Radical Polymerization in the Presence of Alkoxyamines and Transition Metals", Macromolecule Symposium, 1996, vol. 111, pp. 47-61.

Matyjaszewski, "Radical Nature of Cu-Catalyzed Controlled Radical Polymerizations (Atom Transfer Radical Polymerization)," Macromolecules, 1998, 31, 4710-4717.

Matyjaszewski, Controlled Radical Polymerization, American Chemical Society Division of Polymer Chemistry, 1998, ACS Symposium Series, Ch. 1, pp. 2-30. vol. 685.

Matyjaszewski, et al., Macromolecules 34, 5125 (2001).

Matyjaszewski, et al., Tetrahedron (1997), 53, 15321-15329.

McCarthy et al., Grafting Chromatographic Stationary Phase Substrates by Atom Transfer Radical Polymerization, in Controlled Radical Polymerization: From Synthesis to Materials, American Chemical Society Division of Polymer Chemistry, 2005, Chapter 18, pp. 252-268, vol. 944.

Min, et al, "Atom Transfer Radical Dispersion Polymerization of Styrene in Ethanol", Macromolecules, ACS, Washington, DC, US, vol. 40, No. 20, (Oct. 2, 2007), pp. 7217-7221.

Mitani, et al., J. Am Chem. Soc. 105, 6719 (1983).

Nagashima, J. Org. Chem. 57, 1682 (1992).

Nagashima, J. Org. Chem. 58, 464 (1993).

Navon, et al., Inorg. Chem. 1999, 38, 3484.

Nishikawa et al., Evidence for Living Radical Polymerization of Methyl Methacrylate with Ruthenium Complex: Effects of Protic and Radical Compounds and Reinitiation from the Recovered Polymers, Macromolecules, 1997, pp. 2244-2248, vol. 30(8).

Odell, et al., Macromolecules, 1995, 28, 8453.

Odian, Principles of Polymerization, Third Edition, John Wiley & Sons, p. 205-233 (1991).

Orochov et al., Redox-Transfer, Part VI, Determination of Hammet's P-Constant for the Oxidation of Cuprous Chloride by Aromatic Sulphonyl Chlorides, Journal of the Chemical Society (B), (1969), pp. 255-259.

Orochov, et al., J. Chem. Soc., Perkin II, 1000 (1973).

Orr, Thermochemical Aspects of Butadiene-Styrene Copolymerization, 1960, pp. 74-82.

Otsu, et al., Chem. Express 5(10), 801 (1990).

Otsu, et al., Synthesis, Reactivity, and Role of—Vinylbenzyl N,N-Diethyldithiocarbamate as a Monomer-Iniferter in Radical Polymerization, Macromolecules, 1986, pp. 287-290, vol. 19(2).

Pakuka et al., Polymers, Particles, and Surfaces with Hairy Coatings: Synthesis, Structure, Dynamics, and Resulting Properties, in ACS Symposium Series, Advances in Controlled/living Radical Polymerizations, American Chemical Society Division of Polymer Chemistry, 2003, Chapter 26, pp. 366-382, vol. 854.

Paoletti, et al., Inorg. Chem. 1967, 6, 64.

Paoletti, et al., Inorg. Chim. Acta Rev. 1973, 7, 43.

Makino, Takayuki, Chemistry of Synthetic High Polymers; Univ. of Southern California, Los Angeles, CA, USA. Dissertation;1997; p. 90-134 pp, "Anionic synthesis of highly isotactic polystyrene in the presence of lithium hydroxide or lithium alkoxides, and, controlled "living" emulsion polymerization of methyl methacrylate by atom transfer radical polymerization."

Patten et al., Atom Transfer Radical Polymerization and the Synthesis of Polymeric Materials, Advanced Materials, 1998, pp. 901-915, vol. 10(12).

Patten et al., Polymers with very Low Polydispersities from Atom Transfer Radical Polymerization, 1996, Science, pp. 866-868, vol. 272.

Percec et al., "Living" Radical Polymerization of Styrene Initiated by Arenesulfonyl Chlorides and $Cu^1(bpy)_nCI$, Macromolecules, 1995, pp. 7970-7972, vol. 28(23).

Percec et al., Metal-Catalyzed "Living" Radical Polymerization of Styrene Initiated with Arenesulfonyl Chlorides. From Heterogeneous to Homogeneous Catalyses, Macromolecules, 1996, pp. 3665-3668, vol. 29(10).

Percec et al., Self-Regulated Phase Transfer of $Cu_2O$/bpy, Cu(0)/bpy, and $Cu_2O$(Cu(0)/bpy Catalyzed "Living" Radical Polymerization Initiated with Sulfonyl Chlorides, Macromolecules, 1998, pp. 4053-4056, vol. 31(12).

Pintauer et al., Toward Structural and Mechanistic Understanding of Transition Metal-Catalyzed Atom Transfer Radical Processes, in ACS Symposium Series, Advances in Controlled/living Radical Polymerizations, American Chemical Society Division of Polymer Chemistry, 2003, Chapter 10, pp. 130-147, vol. 854.

Punna et al., Click Chemistry in Polymer Synthesis, Polymer Preprints, 2004, pp. 778-779, vol. 45(1).

Puts, et al., Macromolecules, 1996, 29, 3323.

Qiu et al., Cyclic Voltammetric Studies of Copper Complexes Catalyzing Atom Transfer Radical Polymerization, Macromolecular Chemistry and Physics, 2000, pp. 1625-1631, vol. 201(14).

Queffelec et al., Optimization of Atom Transfer Radical Polymerization Using Cu(I)/Tris(2-(dimethylamino)ethyl)amine as a Catalyst, Macromolecules, 2000, pp. 8629-8639, vol. 33.

Quirk et al., Makromol. Chem., Macromol. Symp. 67, pp. 351-363 (1993), "Mechanistic Aspects of Group Transfer Polymerization".

Richard et al., Acrylate-Based Block Copolymers Prepared by Atom Transfer Radical Polymerization as Matrices for Drug Delivery Applications, in Controlled Radical Polymerization: From Synthesis to Materials, American Chemical Society Division of Polymer Chemistry, 2005, Chapter 17, pp. 234-251, vol. 944.

S.A.F. Bon et al., Controlled Radical Polymerization in Emulsion, Macromolecules, 1997, pp. 324-326, vol. 30(2).

Samuni et al., "On the cytotoxicity of vitamin C and metal ions," European Journal of Biochemistry, 1983, 137. 119-124.

Schubert et al., Design of Effective Systems for Controlled Radical Polymerization of Styrene: Application of 4,4'-Dimethyl and 5,5'-Dimethyl 2,2'-Bipyridine Copper(ii) Complexes, Macromolecular Rapid Communication, 1999, pp. 351-355, vol. 20.

Schulz & Milkovich, Relative Reactivities and Graft Distributions of Polystyrene Macromers in Vinyl Chloride Copolymerization, Polymer International, 1994, pp. 141-149, Great Britain.

Seijas, et al., Tetrahedron, 48(9), 1637 (1992).

Shen, et al., Supported Atom Transfer Radical Polymerization of Methyl Methacrylate Mediated by CuBr-Tetraethyldiethylenetriamine Grafted onto Silica Gel—Journal of Polymer Science: Part A: Polymer Chemistry, vol. 39, 1051-1059 (2001); John Wiley & Sons, Inc.

Srivastava, et al., J. Inorg. Nucl. Chem. (1980), 42, 47.

Stille et al., Synthesis and Copolymerization of Styryl-Substituted Tetrazoles. Thermal Cross-Linking of Copolymers Containing Dipolarophiles and the Tetrazoles as Nitrile Imine Dipole Precursors, Macromolecules, 1972, pp. 377-384, vol. 5(4).

Sumerlin et al., Click Functionalization of Well-Defined Copolymers Prepared by Atom Transfer Radical Polymerization, in Controlled Radical Polymerization: From Synthesis to Materials, American Chemical Society Division of Polymer Chemistry, 2005, Chapter 11, pp. 140-152, vol. 944.

Takeichi et al., Preparation of Porous Carbon Films by the Pyrolysis of Poly(Urethane-imide) Films and Their Pore Characteristics, Carbon, 2001, pp. 257-265, vol. 39(2).

Tang, et al., J. Am. Chem. Soc., 128, 1598-1604 (2006).

Tsarevesky et al., Factors Determining the Performance of Copper-Based Atom Transfer Radical Polymerization Catalysts and Criteria for Rational Catalyst Selection, in Controlled Radical Polymerization: From Synthesis to Materials, American Chemical Society Division of Polymer Chemistry, 2005, Chapter 5, pp. 56-70, vol. 944.

Tsarevsky et al., Well-Defined (Co)polymers with 5-Vinyltetrazole Units via Combination of Atom Transfer Radical (Co)polymerization of Acrylonitrile and "Click Chemistry"—Type Postpolymerization Modification, Macromolecules, 2004, pp. 9308-9313, vol. 37(25).

Udding, et al., J. Org. Chem. 59, 1993 (1994).

Van Gaal et al., "Trends in Redox Potentials of Transition Metal Complexes," Coord. Chem. Rev. 1982, 47, 41.

Veregin, et al., Macromolecules, 1996, 29, 4161.

Vidts, et al., "Design of water-soluble block copolymers containing poly(4-vinylpyridine) by atom transfer radical polymerization", European Polymer Journal, Pergamon Press Ltd, Oxford, GB, vol. 42, No. 1, pp. 43-50 (2006).

Vlcek, "Ligand Based Redox Series," Coord. Chem. Rev. 1982, 43, 39.

Von Werne, et al., Preparation of Structurally Well-Defined Polymer—Nanoparticle Hybrids with Controlled/living Radical Polymerizations—J. Am. Chem. Soc. 1999, 121, 7409-7410.

Wang et al., "Living"/Controlled Radical Polymerization, Transition-Metal-Catalyzed Atom Transfer Radical Polymerization in the Presence of a Conventional Radical Initiator, Macromolecules, 1995, pp. 7572-7573, vol. 28.

Wang et al., Controlled/"Living" Radical Polymerization. Atom Transfer Radical Polymerization in the Presence of Transition-Metal Complexes, Journal of the American Chemical Society, 1995, pp. 5614-5615, vol. 117(20).

Wang et al., Controlled/"Living" Radical Polymerization. Halogen Atom Transfer Radical Polymerization Promoted by a Cu(I)/Cu(II) Redox Process, Macromolecules, 1995, pp. 7901-7910, vol. 28(23).

Wang et al., ESR Study and Radical Observation in Transition Metal-Mediated Polymerization: Unified View of Atom Transfer Radical Polymerization Mechanism, in ACS Symposium Series, Advances in Controlled/living Radical Polymerizations, American Chemical Society Division of Polymer Chemistry, 2003, Chapter 12, pp. 161-179, vol. 854.

Wang, et al., "Facile Synthesis of Acidic Copolymers Via Atom Transfer Radical Polymerization in Aqueous Media at Ambient Temperature", Macromolecules, ACS, Washington, DC, vol. 33, No. 2, (Jan. 25, 2000), pp. 255-257.

Wang, et al., J. Am. Chem. Soc. (1992), 114, 248-255.

Wang, et al., Polym. Prep. (Am. Chem. Soc. Polym. Chem. Div.), 36(1), 465 (1995).

Wayland, et al., Am. Chem. Soc., 116, 7943 (1994).

Webster, Living Polymerization Methods, Science, 1991, pp. 887-893, vol. 25.

Webster, Makromol. Chem., Macromol. Symp. 67, pp. 365-371 (1993), "Mechanism of GTP: Can all of the Available Data be Accommodated?".

Wei et al., Atom Transfer Radical Polymerization of Styrene in the Presence of Iron Complexes, Polymer Preprints, 1997, pp. 231, vol. 38(2).

Wu et al., Efficiency and Fidelity in a Click-Chemistry Route to Triazole Dendrimers by the Copper(I)-Catalyzed Ligation of Azides and Alkynes, Angewandte Chemie, International Edition, 2004, pp. 3928-3932, vol. 43(30).

Xia et al., Controlled/"Living" Radical Polymerization. Homogenous Reverse Atom Transfer Radical Polymerization Using AIBN as the Initiator, Macromolecules, 1997, pp. 7692-7696, vol. 30.

Xia, et al., "Atom Transfer Radical Polymerization of 4-Vinylpyridine", Macromolecules, pp. 3531-3533 (1999).

Zeng, et al., "Synthesis and Characterization of Comb-Branched Polyelectrolytes. 1. Preparation of Cationic Macromonomer of 2-(Dimethylamino)ethyl Methacrylate by Atom Transfer Radical Polymerization", Macromolecules, 33(5), pp. 1628-1635 (2000).

U.S. Appl. No. 09/534,827, filed Mar. 23, 2000.

Gaynor et al., Macromolecules 1998, 31, 5951-5954.

Chambard et al., Macromol. Symp. 2000, 150, 45-51.

Li et al., Macromolecules 2004, 37, 2106-2112.

Min et al., J. Am. Chem. Soc. 2005, 127, 3825-3830.

Min et al., J. Polym. Sci., Part A: Polym. Chem. 2005, 43, 3616.

Antonietti et al., Macromolecules, 1991, 24: 6636-6643.

Feng et al., Gaofenzi Cailiao Kexue Yu Gongcheng; 2005, 21, 117-120.

Feng, et al., J. Appl. Polym. Sci., 2006, 99 1093.

Min et al., Macromolecules 2005, 38, 8131-8134.

Nicolas et al., Macromolecules 2005, 38, 9963-9973.

Ferguson et al., Macromolecules 2005, 38, 2191-2204.

Gilbert et al., Macromolecular Symposia 2006, 231, 84-93.

Chow et al., Adv. Polym. Sci. 2005, 175, 257-298.

Chow et al., Langmuir 1999, 15, 3202-3205.

El-Safty et al., Chem. Mater. 2005, 17, 3137-3145.

Stoffer et al., J. Polym. Sci. Polym. Chem. Ed. 1980, 18, 2641-2648.

Ferrick et al., Macromolecules 1989, 22, 1515-1517.

Kuo et al., Macromolecules 1987, 20, 1216-1221.

Jakubowski et al., Macromolecules 2005, 38, 4139-4146.

Antonietti et al., Macromol. Chem. Phys. 1995, 196, 441-466.

Guo et al., J. Polym. Sci., Part A: Polym. Chem. 1989, 27, 691-710.

Cramer, W. Proc. Chem. Soc. 1914, 30, 293.

Reiner et al., Baskerville Chemical Journal 1953, 4, 15-17.

Singh et al., Zeitschrift fuer Physikalische Chemie (Leipzig) 1957, 207, 198-204.

Parris et al., Discussions of the Faraday Society 1960, 240-247.

Weiss et al., Inorg. Chem. 1964, 3, 1344-1348.

* cited by examiner

ATOM TRANSFER RADICAL POLYMERIZATION IN MICROEMULSION AND TRUE EMULSION POLYMERIZATION PROCESSES

CROSS REFERENCE TO RELATED APPLICATIONS

This application is a U.S. national stage filing under 35 U.S.C. §371 of International Application No. PCT/US2006/033152 filed Aug. 23, 2006 and claims benefit of and priority to U.S. Provisional Application Ser. No. 60/711,044 filed Aug. 23, 2005 and U.S. Provisional Application Ser. No. 60/816,546 filed Jun. 26, 2006, the disclosures of which are incorporated by this reference.

TECHNICAL FIELD OF THE INVENTION

The present invention is directed to atom transfer radical polymerization (ATRP) processes including microemulsion ATRP processes and to ab-initio emulsion ATRP processes.

BACKGROUND OF INVENTION

ATRP is a versatile, controlled/living polymerization process. ATRP has been described by Matyjaszewski in U.S. Pat. Nos. 5,763,548 and 5,807,937 and in the *Journal of Americal Chemical Society*, vol. 117, page 5614 (1995), as well as in ACS Symposium Series 768, and *Handbook of Radical Polymerization*, Wiley: Hoboken 2002, Matyjaszewski, K., and Davis, T. P., editors (*Handbook of Radical Polymerization*), specifically Chapter 11, all hereby incorporated by reference. In controlled polymerizations such as ATRP, fast initiation and low termination rates result in the preparation of well-defined polymers with low polydispersity. A variety of initiators, typically alkyl halides, have been used successfully in ATRP. As used herein, an "ATRP initiator" is a chemical compound or functionalized particle comprising radically transferable atom or group, such as a halogen or a transferable (pseudo)halogen. Many different types of halogenated compounds may be used as potential ATRP initiators. ATRP can be conducted in bulk or in solution using solvents selected to dissolve the formed copolymer.

Living/controlled polymerizations typically, but not necessarily, comprise a relatively low stationary concentration of propagating chain ends in relation to dormant chain ends. When the chain is in the dormant state, the chain end comprises a transferable atom or group. The dormant chain end may be converted to a propagating chain end by loss or weakening of the bond of the transferable atom or group in a reaction with an added transition metal complex.

In ATRP, radically polymerizable monomers are polymerized in the presence of a transition metal catalyst. For a list of radically polymerizable monomers, see U.S. Pat. No. 5,763,548, hereby incorporated by reference. Though the details of the complex mechanism are not fully understood, it is believed that the transition metal catalyst participates in a redox reaction with at least one of an ATRP initiator and a dormant polymer chain. Suitable transition metal catalysts comprise a transition metal and a ligand coordinated to the transition metal. Typically, the transition metal is one of copper, iron, rhodium, nickel, cobalt, palladium, or ruthenium. In some embodiments, the transition metal catalyst comprises a copper halide, and preferably the copper halide in the activator state is one of Cu(I)Br or Cu(I)Cl.

There are basically four types of polymerization in aqueous dispersed media: suspension polymerization, emulsion polymerizations, mini emulsion polymerization and microemulsion polymerizations. The classification of the process depends on the size of the oil droplets and micelles in the aqueous phase and the composition of the individual oil droplets and micelles. Controlled/living emulsion polymerizations are economically and environmentally important for industrial production of commercially viable products. An initial step towards expanding the scope of ATRP to aqueous dispersed media was ATRP in an emulsion polymerization system. [U.S. Pat. No. 6,121,371 and Gaynor, S. G.; Qiu, J.; Matyjaszewski, K. *Macromolecules* 1998, 31, 5951-5954; and Chambard, G.; De Man, P.; Klumperman, B. *Macromol. Symp.* 2000, 150, 45-51.] While some level of control was attained the system behaved in many ways like a suspension polymerization. In this process, the catalyst was initially dissolved in the monomers prior to forming the emulsion. Therefore, the majority of the catalyst was present in the monomer droplets and not the micelles. Only a limited portion of the catalyst could be transported through the aqueous phase from droplets to micelles. Therefore, polymerization occurred throughout the dispersed oil phase.

There has been significant research in miniemulsion polymerization processes for aqueous biphasic ATRP, and other controlled/living radical polymerizations (CRP) processes such as Nitroxide Mediated Polymerization (NMP) and Reversible Addition Fragmentation Transfer (RAFT). See, for example, U.S. Pat. No. 6,759,491, U.S. application Ser. No. 10/271,025 and PCT/US05/007265. Miniemulsion polymerization process overcame the problem of mass transport of monomers and/or catalyst components through the aqueous phase thereby providing significantly improved control over the polymerization their suspension polymerizations. Such improved control may allow preparation of stable latexes comprising polymeric materials of controlled molecular composition and functionality. Homopolymers [Li, M.; Min, K.; Matyjaszewski, K. *Macromolecules* 2004, 37, 2106-2112.], block copolymers [Li, M.; Jahed, N. M.; Min, K.; Matyjaszewski, K. *Macromolecules* 2004, 37, 2434-2441; and Min, K.; Gao, H.; Matyjaszewski, K. *J. Am. Chem. Soc.* 2005, 127, 3825-3830.], and gradient copolymers [Min, K.; Li, M.; Matyjaszewski, K. *J. Polym. Sci., Part A: Polym. Chem.* 2005, 43, 3616.] have been successfully prepared in a miniemulsion polymerization system by ATRP.

U.S. Pat. No. 6,624,262, hereby cited and incorporated by reference in its entirety, describes a controlled radical polymerization process, such as ATRP, that allows preparation of materials where aspects of composition, topology or architecture and functionality can be predetermined in addition to the polymerization exhibiting first-order kinetics behavior, predeterminable degree of polymerization, narrow molecular weight distribution, and long-lived polymer chains. Understanding the scope and meaning of this language is important since prior art microemulsion polymerization procedures discussed below use similar language to that employed in ATRP but do not, and indeed cannot, prepare similar polymers.

There is a need therefore to develop a robust controlled radical polymerization process that can be conducted in dispersed aqueous media that can control all the desired molecular and process parameters. There is also a need for an aqueous dispersed polymerization process that can be conducted with a commercially viable concentration of reagents in commercially viable equipment at a commercially viable scale.

SUMMARY OF INVENTION

Embodiments of the invention are directed to a microemulsion polymerization comprising adding a polymerization catalyst precursor, such as a transition metal complex in the higher of two accessible oxidation states, an ATRP initiator, and an organic solvent to an aqueous solution to form an emulsion. First radically polymerizable monomers and a reducing agent may be added to the emulsion. The reducing agent converts the catalyst precursor to a catalyst for polymerization of the first monomer from the initiator. In certain embodiments the organic solvent may comprise radically polymerizable monomers. The aqueous solution may comprise a surfactant.

Further embodiments are directed to an ab initio polymerization process comprising adding a polymerization catalyst precursor; an ATRP initiator, and an organic solvent to an aqueous solution to form an emulsion, wherein the organic solvent comprises second radically polymerizable monomers, adding a reducing agent to convert the catalyst precursor to a catalyst for polymerization of the first radically polymerizable monomer from the initiator; and adding first radically polymerizable monomers to the emulsion.

Therefore before describing the present invention in detail, it is to be understood that this invention is not limited to specific compositions, components or process steps, as such may vary. It is also to be understood that the terminology used herein is for the purpose of describing particular embodiments only, and is not intended to be limiting.

As used in the specification and appended claims, the singular forms "a," "an," and "the" include plural referents unless the context clearly dictates otherwise. Thus, for example, reference to "a polymer" may include more than one polymer, reference to "a substituent" may include more than one substituent, reference to "a monomer" may include multiple monomers, and the like.

In describing and claiming the present invention, the following terminology will be used in accordance with the definitions set out below.

The term "polymer" is used to refer to a chemical compound that comprises linked monomers, and that may or may not be linear; the term "polymer" includes homo polymer and copolymers. "Optional" or "optionally" means that the subsequently described circumstance may or may not occur, so that the description includes instances where the circumstance occurs and instances where it does not. For example, the phrase "optionally substituted" means that a non-hydrogen substituent may or may not be present, and, thus, the description includes structures wherein a non-hydrogen substituent is present and structures wherein a non-hydrogen substituent is not present. The term "narrow molecular weight distribution" or "narrow polydispersity" are used herein to mean a molecular weight distribution or polydispersity of less than 2.0.

In the following discussion, the actual experiments are identified using the numbering system employed in the note books. There is no significance other than identification to the numbering system.

DESCRIPTION OF EMBODIMENTS OF THE INVENTION

Figure 1A:
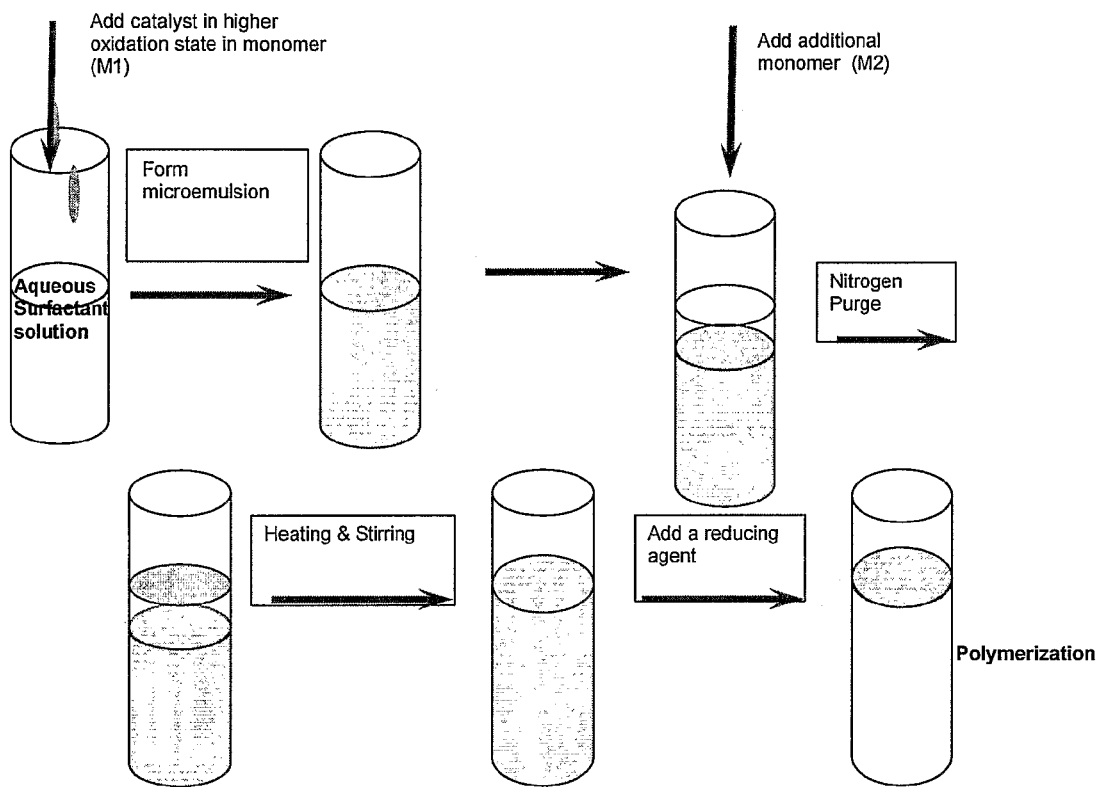
FIG. 1A is a schematic representation of an embodiment of a microemulsion ATRP process comprising adding a polymerization catalyst precursor in the higher oxidation state and first radically polymerizable monomers to an aqueous surfactant solution, forming an emulsion, adding a second radically polymerizable monomer, purging and forming the precursor of an emulsion system, and adding a reducing agent to activate the catalyst complex to initiate the polymerization.

Embodiments are directed to a microemulsion polymerization comprising adding a polymerization catalyst precursor, such as a transition metal complex in the higher of two accessible oxidation states, an ATRP initiator, and an organic solvent to an aqueous solution to form an emulsion. First radically polymerizable monomers and a reducing agent may be added to the emulsion. The reducing agent converts the catalyst precursor to a catalyst for polymerization of the first monomer from the initiator. In certain embodiments the organic solvent may comprise radically polymerizable monomers. The aqueous solution may comprise a surfactant.

Further embodiments are directed to an ab initio polymerization process comprising adding a polymerization catalyst precursor; an ATRP initiator, and an organic solvent to an aqueous solution to form an emulsion, wherein the organic solvent comprises second radically polymerizable monomers, adding a reducing agent to convert the catalyst precursor to a catalyst for polymerization of the first radically polymerizable monomer from the initiator; and adding first radically polymerizable monomers to the emulsion. As used herein, an "ab initio" polymerization is a polymerization process in which an emulsion is present prior to initiation of the polymerization and added monomers can diffuse from monomer droplets to the active micelles.

ATRP has been successfully extended to an ab initio emulsion system using a "two-step" procedure, in which the emulsion polymerization process was formed by adding additional radically polymerizable monomer to an initiated microemulsion ATRP process. In specific embodiments, activators generated by electron transfer (AGET) ATRP initiation process may be used in the microemulsion ATRP process. AGET initiation allows using oxidatively stable catalyst precursors, such as transition metals in the higher of two accessible oxidation states, for example Cu(II), that is reduced in situ by a reducing agent, such as ascorbic acid. In certain embodiments of the ab initio polymerization process, the surfactant concentration in the final emulsion system is less than 6 wt % (less than 30 wt % vs monomer). By decreasing the catalyst concentration and changing the ratio of the first radically polymerizable monomer added at the microemulsion stage to the second radically polymerizable monomer added during the second stage the surfactant concentration in the final emulsion system of certain embodiments may be less than 2 wt % (less than 10 wt % vs. monomer). Embodiments of the ab initio ATRP polymerization process avoids the problems of transporting catalysts through the aqueous media during polymerization. A controlled emulsion polymerization is evidenced by a linear first-order kinetic plots and formation of polymers with a narrow molecular weight distribution (Mw/Mn=1.2-1.4), embodiments of the polymerization processes described in the Examples. The resulting polymer had high chain-end functionality and may be successfully chain extended to form in situ block copolymers by adding additional monomer to an ongoing emulsion polymerization. Embodiments of the emulsion ATRP processes as described in the Examples produced stable latexes having a particle size ~120±10 nm.

In ATRP, radically polymerizable monomers may be polymerized in the presence of a transition metal catalyst. The transition metal catalyst participates in a reversible redox reaction with at least one of an ATRP Initiator and a dormant polymer chain. Suitable transition metal catalysts comprise a transition metal and, optionally, at least one ligand coordinated to the transition metal. The activity of the transition metal catalyst depends on the composition of the transition metal and the ligand.

Typically, the transition metal is one of copper, iron, rhodium, nickel, cobalt, palladium, molybdenum, manganese, rhenium, or ruthenium. In some embodiments, the transition metal catalyst comprises a copper halide, and preferably the copper halide is one of Cu(I)Br or Cu(I)Cl. To function as an ATRP catalyst, the transition metal must have at least two readily accessible oxidation states separated by one electron, a higher oxidation state and a lower oxidation state. The reversible redox reaction results in the transition metal catalyst cycling between the higher oxidation state (the "deactivator state") and a lower oxidation state (the "activator state") while the polymer chains cycle between having propagating chain ends and dormant chain ends. Living/controlled polymerizations typically, but not necessarily, comprise a relatively low stationary concentration of polymers comprising propagating chain ends in relation to polymers having dormant chain ends. When the polymer has a dormant chain end, the chain end comprises the transferable atom or group. The dormant chain end may be converted to a propagating chain end by loss of the transferable atom or group to the transition metal catalyst. The description of the mechanism of an ATRP is provided for explanation and is not intended to limit the invention. The disclosed mechanism is generally accepted, but different transition metal catalyst may result in different mechanisms. The ligand affects the structure of the catalyst, the solubilizing effect, and catalyst activity. See Catalyst Development www.chem.cmuedu/groups/maty/about/research/05.html, hereby incorporated by reference.

In various embodiments of ATRP, the catalyst is matched with the initiator to initiate the polymerization. In a Normal ATRP, the reaction medium initially comprises an initiator comprising a radically transferable atom or group and a catalyst in its lower oxidation state of the two accessible oxidation states. During the polymerization process, the radically transferable atom or group transfers to the transition metal catalyst producing a catalyst in the higher of the two accessible oxidation states and an initiator with a propagating chain end. The monomer may then add to the initiator at the propagating chain end until the radically transferable atom or group is transferred back to the propagating chain end to form a dormant chain end on growing polymer. The process is then repeated until the polymer is terminated or the reaction stops.

In a Reverse ATRP, the catalyst is added in the higher of the two accessible oxidation states and a conventional radical initiator is used. The catalyst in the higher of two oxidation states is generally more stable and more easily handled that the transition metal catalyst in the lower oxidation state, since it may not be oxidized as readily in the polymerization media. After addition and gradual decomposition of the conventional radical initiator to radicals, the transition metal in the higher oxidation state is reduced to its lower oxidation state by reaction of the initiating/propagating radicals thereby initiating the polymerization of monomers.

In Activators Generated by Electron Transfer ("AGET") ATRP, the catalyst is added in the higher of the two accessible oxidation states and an ATRP initiator is used. To initiate the polymerization a reducing agent is added to reduce the catalyst from the deactivator state to the activator state.

An embodiment of the microemulsion polymerization process is shown schematically in FIG. 1A. In this embodiment, the transition metal catalyst comprises a transition metal complexed to a hydrophobic ligand. The hydrophobic ligand causes the catalyst to remain substantially in the oil phase of the emulsion in both oxidation states.

Figure 1B:
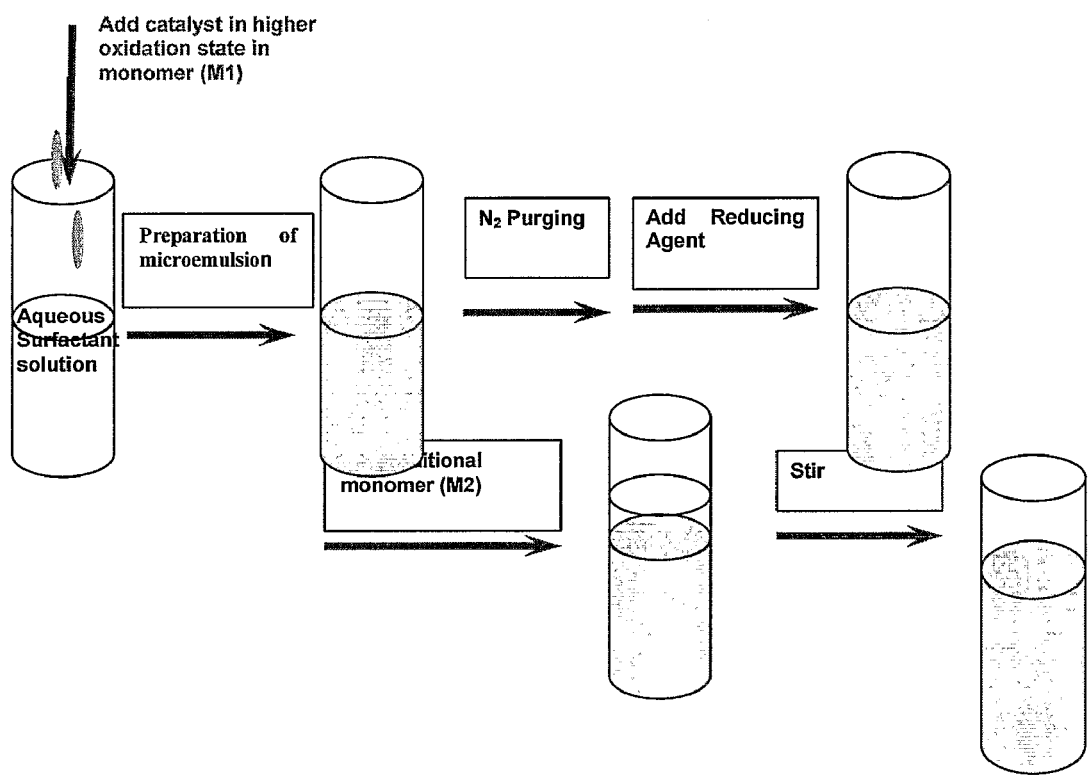
FIG. 1B is a schematic representation of an embodiment of an ab initio emulsion ATRP process comprising adding a polymerization catalyst precursor in the higher oxidation state and first radically polymerizable monomers to an aqueous surfactant solution, forming an emulsion, adding a reducing agent to activate the catalyst complex to initiate the polymerization, and subsequently adding a second radically polymerizable monomer.

An embodiment of an ab initio emulsion polymerization process is shown in FIG. 1B. In this embodiment of the ab initio emulsion ATRP process comprises adding a reducing agent prior to the addition of the radically polymerizable monomer to further ensure encapsulation of the transition metal catalyst and initiator in micelles, as shown in FIG. 1B.

Polymers prepared by microemulsion polymerization processes have been the subject of considerable research interest, because of their small latex size and complex structural behavior, this process results in the preparation of materials that are suitable for use in a broad range of hi-tech applications. [Chow, P.; Gan, L. M. *Adv. Polym. Sci.* 2005, 175, 257-298.] These include cleaning formulations, pharmaceutical formulations for improved drug solubilization/delivery, coating formulations, and many others. [Lindman, B.; Friberg, S. E. In *Handbook of Microemulsion Science and Technology*; Kumar, R; Mittal, K. L., Eds.; Marcel Dekker: New York, 1999.] Because of the small particle size that may be attained in microemulsion systems, the polymer particles possess a significantly large interfacial area which leads to an attractive alternative to emulsion based polymerization procedures for the preparation of ion-containing membranes. [Chow, P. Y.; Chew, C. H.; Ong, C. L.; Wang, J.; Xu, G.; Gan, L. M. *Langmuir* 1999, 15, 3202-3205.] Moreover, microemulsion polymerization has found application for synthesis of templates for the design of mesoporous structures [El-Safty, S. A.; Hanaoka, T.; Mizukami, F. *Chem. Mater.* 2005, 17, 3137-3145] and opened up possibilities for the preparation of inorganic nanomaterials. [Cao, M.; Wu, X.; He, X.; Hu, C. *Langmuir* 2005, 21, 6093-6096.] Unlike a regular emulsion polymerization, the precursor of a microemulsion polymerization system is a thermodynamically stable, optically transparent or translucent, isotropic dispersion of oil in water, containing domains of nanometer dimensions, all stabilized by suitable surfactants. [Gilbert, R. G. *Emulsion Polymerization*; Academic Press: London, 1995.] The initial microemulsion systems typically employed an aliphatic alcohol as a cosurfactant. [Stoffer, J. O.; Bone, T. *J. Polym. Sci. Polym. Chem. Ed.* 1980, 18, 2641-2648.] However, subsequently attention has been focused on the kinetics and mechanisms of three-component microemulsion polymerizations comprising water, oil (including monomers) and a surfactant. [Ferrick, M. R.; Murtagh, J.; Thomas, J. K. *Macromolecules* 1989, 22, 1515-1517.] Most studies have dealt with the polymerization of hydrophobic monomers, typically forming a stable latex composed of polymer particles with particle size ranging from 10 to 100 nm. Although small polymeric particles were produced in these cited examples the polymers comprised high molecular weight, broad molecular weight distribution and limited control over polymer functionality typical of uncontrolled polymerization processes.

Microemulsion polymerization processes are considered to involve a micellar nucleation mechanism for polymerization of hydrophobic monomers in monomer-swollen micelles. [Kuo, P. L.; Turro, N. J.; Tseng, C. M.; El-Aasser, M. S.; Vanderhoff, J. W. *Macromolecules* 1987, 20, 1216-1221.] Therefore, a microemulsion polymerization is similar to a miniemulsion polymerization in that there are not a significant amount of large monomer droplets (with the size of several micrometers) suspended in the dispersed media prior to initiation of the polymerization. The monomer-swollen micelles behave as individual nano-reactors during a microemulsion polymerization and, therefore, mass transfer of reactants may essentially be ignored. A microemulsion polymerization provides a feasible reaction environment for a catalytic controlled/living radical polymerization such as ATRP, since the catalyst may be present in the oil phase during the polymerization, particularly if a sufficiently hydrophobic ligand is complexed to the transition metal. However, as described below, selecting conditions for controlled initiation of the ATRP reaction has been problematic and apparently has precluded prior attempts to conduct a successful microemulsion ATRP process, particularly one that controls both molecular weight and molecular weight distribution.

The examples provided below disclose the first successful results of conducting a well controlled microemulsion ATRP process. Both Normal ATRP and Reverse ATRP [U.S. Pat. No. 5,763,548] were examined as initiating procedures for a microemulsion ATRP. In addition to Normal and Reverse ATRP, the newly developed AGET ATRP initiative technique [PCT/US05/007265 and Jakubowski, W.; Matyjaszewski, K. Macromolecules 2005, 38, 4139-4146.] was also examined as a means to initiate the polymerization. As shown by the GPC traces of the polymers prepared by emulsion AGET ATRP process, see FIG. 2, polymers with predetermined molecular weight, narrow molecular weight distribution and preselected terminal functional end groups were prepared. AGET ATRP therefore provides a method to initiate a microemulsion ATRP process and further demonstrates steps to be taken in order to run either a Normal or Reverse ATRP in a microemulsion polymerization.

A microemulsion AGET ATRP comprises water, a surfactant, and an oil phase; wherein the oil phase comprises an ATRP initiator, and an air-insensitive transition metal catalyst in the higher of two accessible oxidation states ("catalyst precursor") and, optionally, an organic solvent, the catalyst precursor may be reduced in situ by the addition of a reducing agent.

The reducing agent for an AGET ATRP may be any reducing agent capable of reducing the transition metal catalyst from the higher of two accessible oxidation states to the lower oxidation state, such as, but not limited to, ascorbic acid, tin octonate, reducing sugars such as fructose, antioxidants, such as those used as food preservatives, for example flavonoids (quercetin), beta carotene (vitamin A), α-tocopherol (Vitamin E), propyl or octyl gallate (triphenol) BHA or BHT, other food preservatives such as nitrites, propionic acids, sorbates, or sulfites. The reduction of cupric salts to cuprous salts is discussed in U.S. Pat. No. 2,386,358 where additional suitable reducing agents are disclosed including: $SO_2$, sulfites, bisulfites, thiosulfates, mercaptans, hydroxylamine, hydrazine, and nitrites. Still other reducing agents include substituted hydrazines, hydrazones, amines and substituted amines, phenols, enols and non-acid forming viologens. In certain embodiments, the reducing agent may be a transition metal compound in a zero oxidation state. Further, the reducing agent may be a combination of reducing agents, such as a combination of the reducing agents listed above.

The surfactant may be any surfactant that provides an emulsion of the polymerization medium; does not adversely interact with the ATRP process; and provides colloidal stability for the polymer particles. Any surfactant that meets these requirements may be used, however, cationic and non-ionic surfactants may be more generally useful.

Ionic surfactants are usually selected for conventional radical microemulsion polymerization processes in order to provide better colloidal stability. However, non-ionic surfactants may be preferred for certain embodiments of emulsion ATRP processes in aqueous dispersed media such as ATRP microemulsion polymerization processes. Brij 98 was used as the exemplary non-ionic surfactant in the following examples; although other surfactants exemplified in miniemulsion ATRP's will also work. See Table 1 for examples of some useful surfactants.

TABLE 1

Example Surfactants

| | HLB | Surf. | T. | Time | Conv. | $M_{n,th}$ | $M_{n,sec}$ | $M_w/M_n$ | Latex |
|---|---|---|---|---|---|---|---|---|---|
| SDS | | 2% | 70 | 1.4 h | 94% | 26,700 | 179,000 | 5.22 | + |
| DTAB | | 5% | 70 | 2.1 h | 84% | 23,900 | 28,000 | 1.19 | − |
| PEG 1000 | 20 | 10% | 90 | 1.0 h | | | 24,000 | 1.21 | − |
| PEG 4600 | 20 | 10% | 90 | 1.0 h | | | 23,000 | 1.20 | − |
| Tween 20 | 16.7 | 2% | 70 | 2.0 h | 90% | 25,600 | 35,230 | 1.22 | − |
| Brij 98 | 15.3 | 2% | 70 | 1.7 h | 88% | 25,000 | 34,000 | 1.25 | + |
| Tween 80 | 15.0 | 2% | 70 | 2.0 h | 86% | 24,500 | 34,600 | 1.23 | + |
| Brij 97 | 12.4 | 5% | 90 | 0.7 h | 85% | 24,200 | 26,800 | 1.25 | − |

Tween
HO(CH$_2$CH$_2$O)$_w$  (OCH$_2$CH$_2$)$_x$OH

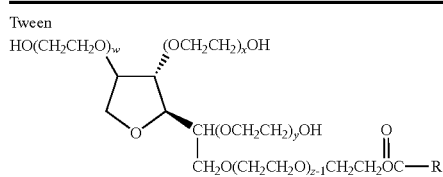

$w + x + y + z = 20$, R = lauryl (Tween 20) or oleyl (Tween 80)
PEG
H(OCH$_2$CH$_2$)$_n$OH
Brij
C$_{18}$H$_{35}$(OCH$_2$CH$_2$)$_n$OH
n = 10 (Brij 97), 20 (Brij 98)

Ligand

The primary functions of the ligand are solubilizing the transition metal salt in the organic media and to adjusting the redox potential and halogenphilicity of the metal center. In certain embodiments a transition metal catalyst comprising a suitably hydrophobic ligand may be preferred to conduct a well controlled ATRP in aqueous dispersed media. *Gaofenzi Cailiao Kexue Yu Gongcheng* 2005, 21, 117-120, described the use of a water soluble catalyst complex comprising bipyridine in an emulsion ATRP process which displays poor control. In contrast, Bis(2-pyridylmethyl) octadecylamine (BPMODA) is an exemplary ligand that is sufficiently hydrophobic. A ligand is sufficiently hydrophobic if the catalyst, or catalyst precursor, remains significantly within the organic phase, i.e. the pre-polymeric particles, and provides an active catalyst complex that provides sufficient control over the polymerization to provide an acceptable polymer for an application. In some instances, the more hydrophobic the ligand is the lower the concentration of catalyst that may be added to the polymerization medium. A more hydrophobic ligand will cause the catalyst in the higher oxidation state to remain substantially in the oil phase and therefore provide control over the polymerization and can allow an ARGET ATRP to be conducted. [Jakubowski, W., K. Min, et al. (2006). "Activators Regenerated by Electron Transfer for Atom Transfer Radical Polymerization of Styrene." *Macromolecules* 39(1): 39-45.]

Emulsion Polymerizations

Methyl methacrylate (MMA) and styrene were initially selected as representative of the radically copolymerizable monomers that may be polymerized by emulsion ATRP processes of the two, MMA is a more active monomer. Table 2 lists the concentration of each reagent in the initial series of examples in addition to the molecular weight and molecular weight distribution of each polymer prepared.

system. The bluish color is the result of an increase in the size of the dispersed phase due to micelle agglomeration and the higher refractive index of the polymer generated. [Guo, J. S.; El-Aaser, M. S.; Vanderhoff, J. W. *J. Polym. Sci., Part A: Polym. Chem.* 1989, 27, 691-710.] The final microlatex appeared as a translucent liquid with final particle size of ~42 nm according to the dynamic light scattering (DLS) measurement (Table 2, column 6). The molecular weight distribution of the final polymer was broad, PDI 6.10 (FIG. 2) as expected for a conventional radical polymerization.

Normal Atom Transfer Radical Polymerization

A Normal ATRP microemulsion process was attempted in runs number 2 and 3 in Table 2, the microemulsion was prepared by emulsification of the catalyst complex, monomer and surfactant in the aqueous suspending media through magnetic stirring. The hydrodynamic diameter ($D_h$) of the initial micelles was around 10 nm according to DLS measurements. After deoxygenating the microemulsion, an alkyl halide initiator was added to initiate the polymerization. After injection of the ATRP initiator, the system turned slightly translucent from the initial transparent state, evidencing a fast nucleation and initiation of the polymerization. The nucleation period was short, and the particle size approached the final value after 30 minutes. The initial micelles comprised, on average, ~3,000 MMA molecules and ~15 Cu complexes. For quantitative uniform initiation, ~15 ATRP initiators should diffuse into each micelle generating polymer chains with a designed molecular weight of $M_n$ ~20,000 g/mol. However, since the catalyst inside the micelles was exclusively in the activator state, Cu(I), the polymerization could be initiated within that micelle by atom transfer from any individual entering ATRP initiator, leading to a situation where there is a single propagating radical and a single Cu(II) complex in the micelle. If the Cu(II) species stays in the micelle, it could deactivate the growing radical and mediate a controlled radical polymeriza- TABLE 2[a]

Conventional Radical Microemulsion Polymerization Processes and ATRP Microemulsion Polymerization Processes

| Run No. | Polymerization Process | Monomer | $[M]_0:[I]_0:[Cat.]_0:[V-50]_0:[Ascorbic acid]_0$[b] | [Surf.]/ [M][c] | DLS[d] $D_h$ (nm) | σ | TEM D (nm) | $M_n$ (g/mol) | PDI |
|---|---|---|---|---|---|---|---|---|---|
| 1. | Conventional | MMA | 200:0:0:0.5:0 | 2.5 | 42 | 0.16 | — | 61,500 | 6.10 |
| 2. | Normal ATRP | MMA | 200:1:1:0:0 | 2.5 | 34 | 0.17 | 25 ± 4 | bimodal | — |
| 3. | Normal ATRP | MMA | 200:1:1:0:0 | 2 | 45 | 0.15 | — | bimodal | — |
| 4. | Reverse ATRP | MMA | 200:0:1:0.5:0 | 2.5 | 70 | 0.20 | 36 ± 15 | 41,000 | 1.61 |
| 5. | AGET ATRP | MMA | 200:1:1:0:0.5 | 2.5 | 43 | 0.16 | 31 ± 3 | 30,000 | 1.28 |
| 6. | AGET ATRP | MMA | 200:1:1:0:0.5 | 1.5 | 80 | 0.15 | — | 31,000 | 1.25 |
| 7. | AGET ATRP | Styrene | 200:1:1:0:0.5 | 2.5 | 38 | 0.16 | — | 17,800 | 1.33 |

[a]The reaction temperature was 65° C. for MMA, 80° C. for styrene. Polymer content (100% conversion) was set as 3%.
[b]The ATRP initiator was ethyl 2-bromoisobutyrate (EBiB). The catalyst was CuBr$_2$/BPMODA, except for Runs No. 2 and No. 3 (CuBr/BPMODA).
[c]Weight ratio of surfactant to monomer.
[d]DLS measurement provided hydrodynamic diameter, Dh, and size distribution function, σ, which represents the variability of the particle size. [Antonietti, M.; Basten, R.; Lohmann, S. Macromol. Chem. Phys. 1995, 196, 441-466.]

Microemulsion Polyermization
Conventional Radical Polymerization

Figure 2:
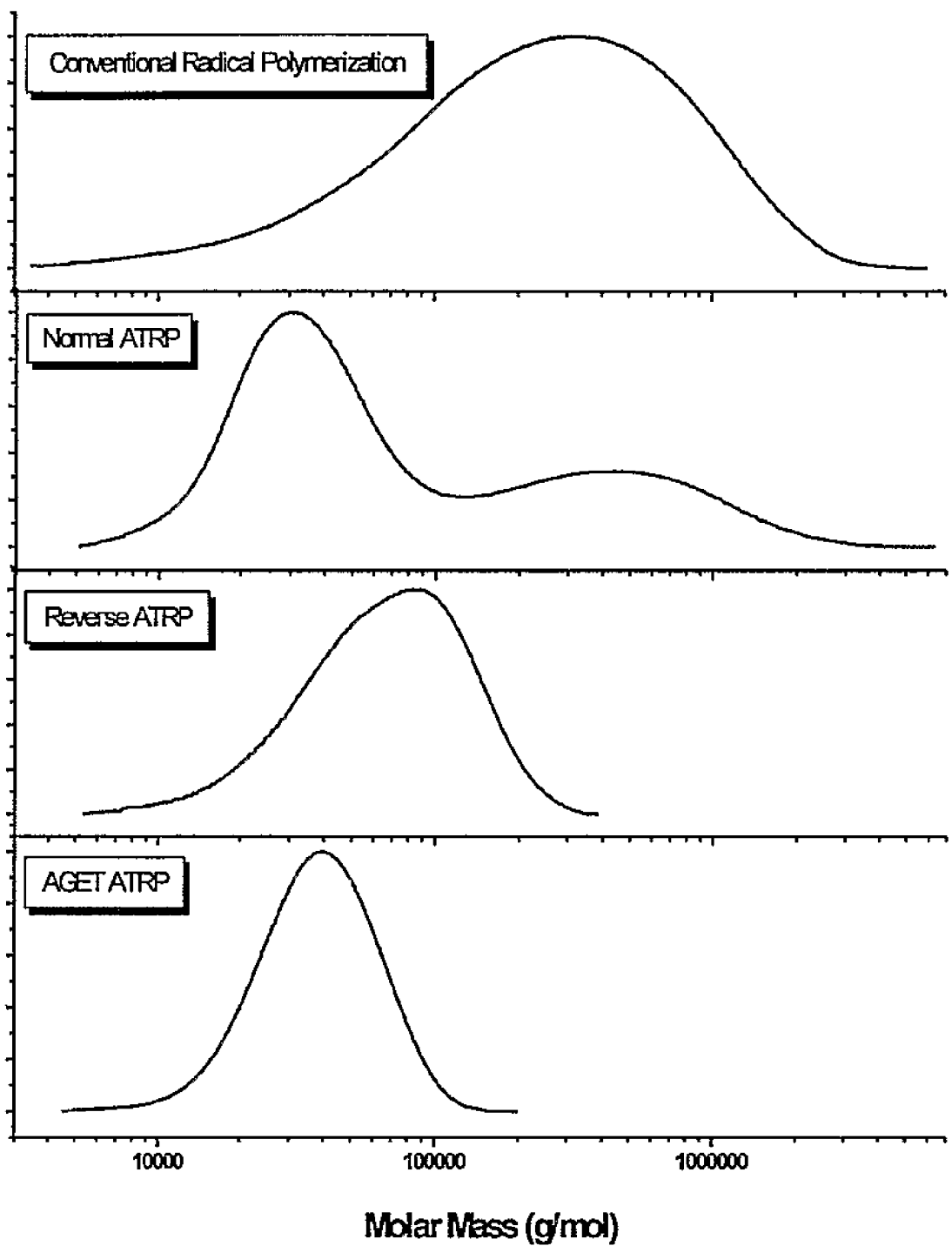
FIG. 2 are typical GPC traces of polymers prepared by conventional radical polymerization, normal ATRP, reverse ATRP, and AGET ATRP of MMA in a microemulsion polymerization process.

The comparative reaction (Run No. 1 in Table 2) is a conventional radical polymerization of MMA in a microemulsion system with a water-soluble conventional radical initiator 2,2'-azobis(2-amidinopropane)dihydrochloride, ("V-50"). The nucleation process started five minutes after the injection of the initiator solution, as indicated by the appearance of a bluish color and reduced transparency of the tion of that single active chain. Subsequently, if more ATRP initiators enter the micelle and join the polymerization, some termination could occur, as in any ATRP, generating excess Cu(II) species and setting up a fully controlled ATRP. However, since the Cu(II) complex has much higher solubility in water than the Cu(I) complex, it may also diffuse out of the micelle. As discussed, at the initial state if only one single Cu(II) species was generated its escape from the micelle should lead to a rapid conventional redox initiated radical polymerization and consumption of all MMA monomer in this micelle (ca. 3,000 monomer molecules); resulting in a polymer with $M_n$ ~300,000 g/mol. Indeed, the polymers produced from normal ATRP in microemulsion displayed two peaks in GPC traces, one peak of $M_n$ ~25,000 g/mol with polydispersity of 1.3 and the other peak of $M_n$ ~300,000 g/mol with polydispersity of 1.7 (FIG. 2). A substantial portion of the polymer contains terminal functionality from the ATRP initiator. Such terminal functionality may provide unique opportunities for utility of the formed polymer such as chain extension or reaction with a second material. The polymer formed by such an embodiment comprises a polydispersity which is advantageous in certain injection molding applications. Furthermore, as is desirable after nucleation, all the polymerization occurred inside the micelles/polymeric particles, which resulted in a narrow distribution of particle size from this example of a "normal ATRP" microemulsion process. According to DLS analysis the size of the final latex was ~34 nm. As measured from TEM images (FIG. 3A), the particle size was slightly smaller (Table 2) because the vacuum applied in TEM analysis results in particle shrinkage due to removal of any attached water molecules.

Reverse Atom Transfer Radical Polymerization

Figure 3:
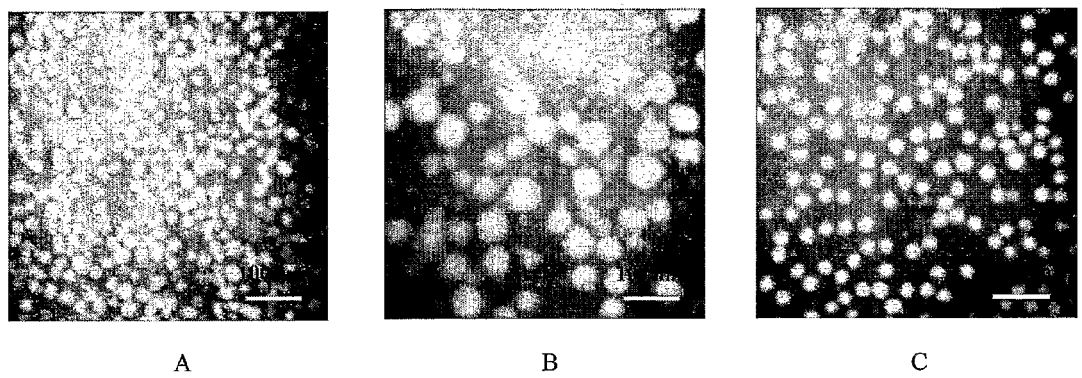
FIG. 3 are Transmission Electronic Microscopic (TEM) images of the micro-latex produced from embodiments of the microemulsion ATRP processes in which the micro-latex shown in (A) is from an embodiment of Normal ATRP, (B) is from an embodiment of Reverse ATRP, and (C) is from an embodiment of AGET ATRP microemulsion process.

In Reverse ATRP, the catalyst is added in the higher of the two accessible oxidation states and, therefore, may not be as susceptible to oxidation in the polymerization media. After addition and gradual decomposition of the water soluble conventional radical initiator, such as for example V-50, the catalyst is reduced to its lower oxidation state by reaction of the initiating/propagating radicals generated by decomposition of the conventional radical initiator and catalyst in its higher oxidation state. Typically, transition metal catalysts in the lower oxidation state complexes are more hydrophobic than the transition metal catalysts in the higher oxidation state complexes and therefore they preferentially migrate too and remain inside the micro-latex. The polymerization rate of a typical Reverse ATRP is slow until the ratio of [Cu(I)]/[Cu(II)] has increased to a sufficient value. The slower initiation assures presence of deactivators in the system and therefore control over the polymerization process. In the reverse ATRP, the nucleation period was longer than in a normal ATRP, because of the relatively slow decomposition of the conventional radical initiator V-50. (At 65° C., the half lifetime of V-50 is around 2 hours.) This slow decomposition resulted in a larger particle size ($D_h$=72 nm) and a broader particle size distribution (as seen in FIG. 3B) but also led to slow, incomplete initiation. Consequentially the molecular weight of the polymers produced from this embodiment of Reverse ATRP microemulsion polymerization process was higher than theoretical values, potentially a consequence of incomplete utilization of the added ATRP initiator. Initiation efficiency for V-50 was only around 55%. No bimodality in GPC traces was observed in polymers prepared by Reverse ATRP in microemulsion but the molecular weight distribution was broader than in similarly run bulk ATRP; Table 2 shows a PDI 1.61, see also FIG. 2. The use of an initiator with a shorter half-life at the desired reaction temperature may result in lower polydispersities and may be preferred in certain embodiments of a Reverse ATRP microemulsion processes. In certain embodiments of a Reverse ATRP microemulsion process, the use of a suitable hydrophobic ligand may retain the complexed catalyst within the micelles and provide an active catalyst complex.

Activators Generated by Electron Transfer Atom Transfer Radical Polymerization Process AGET ATRP microemulsion polymerization processes were performed in which a reducing agent is added to the polymerization media comprising water, surfactant, and an oil comprising ATRP initiators, transition metal catalysts in the higher of two oxidation states and optionally an organic solvent. Because no active catalyst are present in the emulsion initially, the emulsification process is easily performed. Any hydrophobic or hydrophilic reducing agent may be used. Ascorbic acid was selected as an exemplary reducing agent; ascorbic acid is water soluble. Other water soluble reducing agents listed above and in the cited "AGET ATRP" and "ARGET ATRP" applications in addition to compounds listed as being suitable agents for reduction of Cu(II) in numerous inorganic chemistry reviews would also be suitable reducing agents. [Cramer, W. *Proc. Chem. Soc.* 1914, 30, 293; Reiner, M.; Preiss, J. *Baskerville Chemical Journal* 1953, 4, 15-17; Singh, M. P.; Ghosh, S. *Zeitschrift fuer Physikalische Chemie (Leipzig)* 1957, 207, 198-204; Parris, M.; Williams, R. J. P. *Discussions of the Faraday Society* 1960, 240-247; Weiss, J. F.; Tollin, G.; Yoke, J. T., *III Inorg. Chem.* 1964, 3, 1344-1348; Desmarquest, J. P.; Bloch, O. *Electrochim. Acta* 1968, 13, 1109-1113.] Since ascorbic acid may be completely dissolved in the aqueous phase and react with transition metal catalysts in the higher oxidation state either at the surface of the monomer swollen micelles or in the aqueous phase, the activation process is efficient. In AGET ATRP, the initiators are already present in the organic phase and a fast redox reaction between the reducing agent and catalyst in the higher oxidation state is envisioned instead of the slow activation resulting from decomposition of conventional radical initiators as in a reverse ATRP. Furthermore as the polymerization is initiated the deactivation is also efficient because the catalyst is initially present in the deactivating higher oxidation state, Cu(II) for example. Further, any catalyst in the higher oxidation state in the aqueous phase is driven back into the micelles after reduction to the lower oxidation state. This provides efficient well controlled initiation and propagation and consequently results in a high degree of control over all aspects of the microemulsion polymerization. The size distribution of the polymer particles was very narrow (FIG. 3C) and was influenced by the ratio of the surfactant to the monomer as in prior art uncontrolled radical polymerizations. Progressively decreasing the surfactant concentration to levels below 10 mole % relative to monomer, (Table 2), still resulted in the formation of a stable microlatex, but with progressively larger particle size.

In order to exemplify the broad applicability of the microemulsion ATRP process another radically copolymerizable monomer, styrene, was successfully polymerized by ATRP in microemulsion (Run no. 7, Table 2). As expected the polymerization rate for styrene was slower than MMA using the same catalyst system. Nevertheless, a controlled polymerization was attained with the final molecular weight $M_n$=17,800 g/mol and PDI=1.33. The final product was a stable translucent microlatex with the $D_h$=~38 nm.

Figure 4:
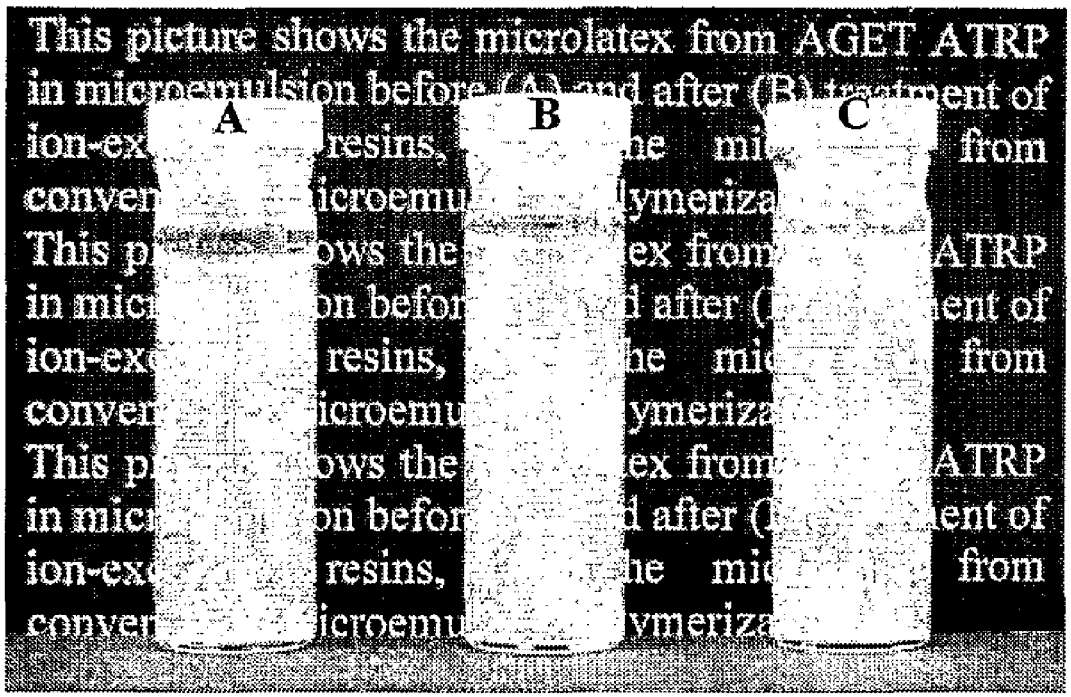
FIG. 4 shown the difference in appearance between a microlatex formed by an embodiment of a microemulsion ATRP process before (A) and after (B) treatment with ion-exchange resins to remove the catalyst, and the microlatex produced by a conventional microemulsion polymerization (C)

Despite differences among the initiation techniques, ATRP in microemulsion resulted in the formation of translucent stable microlatexes with particle size around 40 nm. The small particle size indicates a relatively large surface area, which suggests that after the polymerization has been terminated by exposure to air, the resulting transition metal complexes can be easily removed by surface exchange treatments. A Dowex MSC-1 ion-exchange resin was used for an exemplary transition metal removal treatment. The ion exchange resin was stirred together with the microlatex from the ATRP polymerization for 2 hours. It was observed that the blue color present in the ATRP microemulsion polymerization, resulting from the presence of Cu(II), almost completely disappeared. The microlatex showed a similar stability and appearance to that of a conventional microemulsion polymerization (FIG. 4). In one embodiment, a hydrophilic ligand may be added to increase the rate of exchange to the stable emulsion prior to exposing the system to an ion exchange resin. The addition of a second more water soluble ligand increases the concentration of the Cu(II) in the aqueous phase and increases the efficiency of catalyst removal.

Ab Initio Atom Transfer Radical Polymerization Emulsion Polymerization

Further embodiments of the present invention, are directed to well controlled "emulsion" ATRP, for example, an ab initio emulsion ATRP process comprising polymerizing radically polymerizable monomers in an oil phase comprising the radically polymerizable monomers and a catalyst, wherein the oil phase is in an aqueous phase, comprising water and low levels of surfactant resulting in production of materials with well controlled molecular parameters. Low levels of surfactant means that the final molar ratio of surfactant to monomer is less than 15%. The present invention is also directed to an emulsion ATRP process comprising forming micelles in an aqueous media, wherein the micelles comprise a catalyst precursor, an ATRP initiator, and, optionally, first radically polymerizable monomers, solvent or a combination of first radically polymerizable monomers and solvent; adding second radically polymerizable monomers to the aqueous medium; and forming an emulsion. The emulsion may be formed by any methods known in the art, such as heating or agitating to disperse the monomer(s) in the suspension medium. The emulsion comprises two particles or oil phases, the first particles are stable micelles comprising the catalyst precursor, an ATRP initiator or, if the polymerization has been initiated, a catalyst complex and active polymerizing macroinitiator and, optionally, first radically polymerizable monomers and/or solvent and the second particles comprising the second monomer.

In one embodiment, forming the micelles may be accomplished by adding a catalyst precursor, first radically polymerizable monomers, an ATRP initiator to an aqueous media, wherein the aqueous media comprises water and a dissolved surfactant. Stable micelles may be formed by known emulsion procedures.

Adding second radically polymerizable monomers to the aqueous medium can additionally be used, for example, to form a gradient copolymer or other polymer topology. The second radically polymerizable monomer may be added sequentially, periodically, or continuously to the system during or before initiation of the polymerization of the first monomers. For example, to form block copolymers, the second (co)monomer(s) may be added after 80% or more of the first comonomer has polymerized. The first radically polymerizable monomer may be the same or different than the second radically polymerizable monomer. The process may further comprise adding a third radically polymerizable monomer or as many monomers are required to achieve the desired polymer.

In an alternate embodiment, the ATRP microemulsion polymerization process may comprise adding second monomers to an aqueous media and, subsequently, adding a catalyst precursor, adding an ATRP initiator, and, optionally, adding a first radically polymerizable monomer, solvent, or combination of first radically polymerizable monomers and a solvent to the aqueous media.

An embodiment of the ab inito emulsion ATRP process is shown in FIG. 1B. Such embodiment of the ab inito emulsion ATRP process, comprises forming micelles in an aqueous media, wherein the micelles comprise a catalyst precursor, an ATRP initiator, and first radically polymerizable monomers, solvents, or a combination thereof; adding a reducing agent to the aqueous media to activate the catalyst precursor and initiate polymerization of the first monomers; and adding second radically polymerizable monomers to the aqueous media and forming a stable emulsion by known procedures, such as heating or agitating to disperse the monomers in the aqueous media. The second radically polymerizable monomers may diffuse through the aqueous media to the micelles wherein the second radically polymerizable monomers are incorporated into the polymer chain.

Gradient Copolymers

Figure 5:
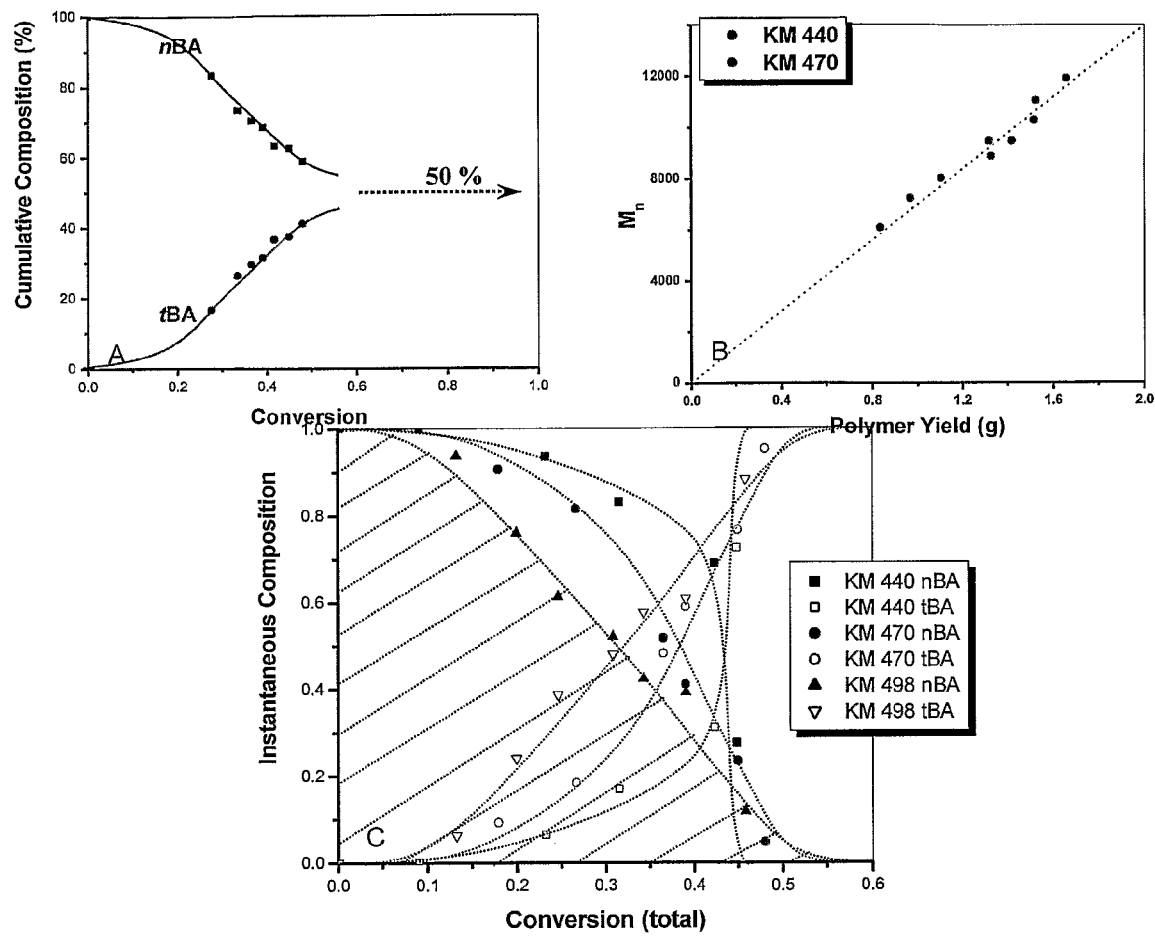
FIG. 5 shows various kinetic plots of data gathered from embodiments of a microemulsion ATRP process for preparing a gradient copolymer of t-butyl acrylate and n-butyl acrylate demonstrating controlled incorporation of a second monomer into an active bi-phasic ATRP in which (A) is a graph of the composition of the gradient polymer versus conversion; (B) is a graph of polymer yield in grams versus number average molecular weight, and (C) is a graph of data from various embodiments of conversion versus instantaneous composition.

A forced gradient emulsion ATRP processes, comprises forming an emulsion with a first radically polymerizable monomer within the micelles with the catalyst and initiator and adding a second different radically polymerizable monomer after initiating the polymerization. Not wishing to be limited by mechanism, it is believed the second monomer forms separate monomer droplets and diffuses though the suspension medium to the micelles where the polymerization process is occurring thus the second monomer is incorporated into the growing polymer chain. Example 1 describes an emulsion ATRP process comprising forming an emulsion with n-butyl acrylate ("nBA") in the micelles and continuously adding t-butyl acrylate ("tBA") over a period of time period to the aqueous phase of the polymerization. The results of Experiment KM 440 disclose the distribution of the two monomers along the backbone of the gradient copolymer. The gradient copolymer has a fairly sharp gradient shape (see FIG. 5). As the total conversion increased to 60%, the instantaneous composition of nBA monomer in polymer decreased from 100% to 0%. This means nBA reacted fast at the beginning of the reaction, i.e., the concentration of tBA was not yet high enough within the active dispersed microemulsion micelle for the comonomer to be significantly incorporated into the polymer chain but as the concentration of tBA increased, the tBA diffused to the active micelles and began to become incorporated into the growing polymer chain. The addition rate of the second radically polymerizable monomer may be regulated in order to produce a gradient copolymer comprising a different shape of gradient along the copolymer backbone, (see Experiments KM 470 and 498 and FIG. 5C).

The molecular weight of gradient polymer followed the theoretical values very well, (see FIG. 5B) evidence that there was a relatively constant number of "active" chains during the polymerization. Example 1 shows that the second monomer could diffuse to the active micelle and become incorporated into the growing chain.

The concept of a gradient copolymer formed by addition of one monomer to an active ongoing living radical copolymerization can be expanded to include preparation of tailored statistical copolymers. In such an embodiment, the instantaneous monomer concentrations within the micelles are maintained at a substantially constant molar ratio of the first monomer and the second monomer to compensate for differences in reactivity ratio. This allows the different monomers to be incorporated into the polymer chain at substantially the same rate.

Figure 6:
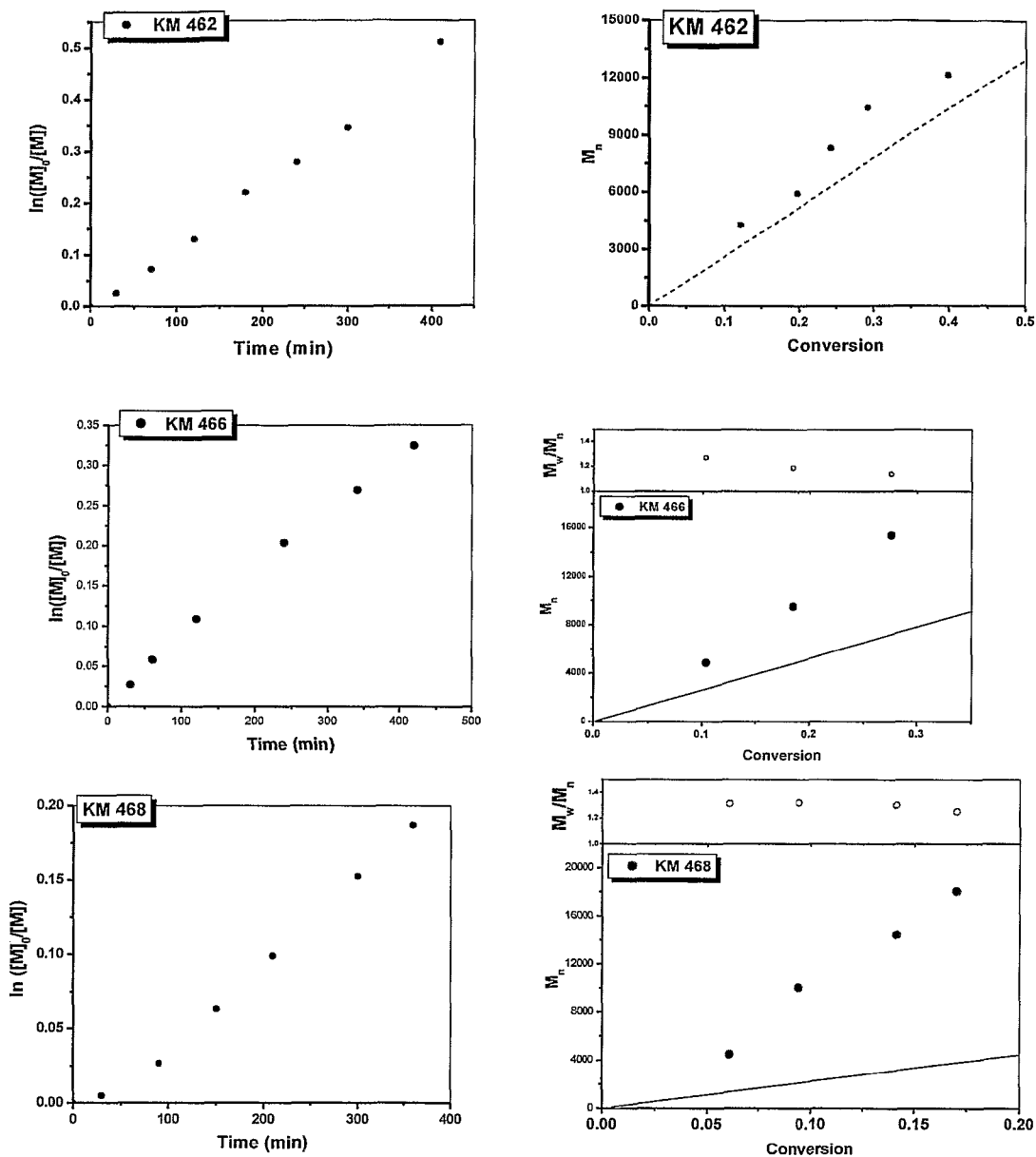
FIG. 6 shows various kinetic plots of data gathered from embodiments of a microemulsion ATRP process comprising styrene monomers.

Embodiments of true ab-initio emulsion ATRP, see below in Table 3, particularly in the Examples with styrene as the monomer, the polymerizations were well controlled. All the polymerizations followed first order kinetics despite the low concentration of surfactants. (see FIG. 6) However, as the amount of surfactant was decreased from a ratio of [Surfactant]:[M]. equal to 0.44 through 0.22 down to 0.057, the molecular weight gradually deviated from the theoretical values, indicating decreased initiation efficiency. The reason for this increasing deviation from complete control was considered to be that the selected low molecular weight polar initiator, 2-ethyl bromoisobutyrate, could diffuse out of the micelle during the formation of the emulsion as the amount of surfactant was decreased. The result would be that if the initiator in the aqueous phase had a chance to initiate polymerization of water soluble monomers those chains would be quenched quickly by water and the active chain end functionality would be lost, since only the live chains remaining inside the polymeric particles retain the transferable functionality and can continue to participate in the controlled polymerization. Therefore, loss of initiator into the suspension medium results in higher than targeted MW. As the polymer chains grow longer, they are less likely to diffuse out of the micelles, which contributed to the controlled molecular weight and narrow molecular weight distribution.

concentration was economically low thereby providing a commercially attractive process.

Hydrophobic Initiators

In certain embodiments of any of the ATRP processes in aqueous media, the ATRP initiator may be hydrophobic. Certain experiments of ATRP processes in aqueous media with butyl acrylate and methyl methacrylate were less controlled. The reduction in control may be attributable to the large $k_p$ of BA and low $k_{deactivation}$ of MMA in emulsion polymerization or may possibly be attributed to the diffusion of the ATRP initiators from the micelles. Since acrylate and methacrylate based polymers retain the end functionality in water, the ATRP initiators in the aqueous phase may initiate new polymer chains. The polymer chains formed in the aqueous phase may, however, exhibit poor control because of the inefficiency of the catalyst in the aqueous phase. Therefore, the molecular weight distributions were broadened. Hydrophobic initiators, such as short ATRP initiators comprising a hydrophobic segment, such as an alkyl, aryl chain, a polystyrene segment or an octadecyl-substituent on the "standard" initiator may be used to control diffusion of the initiator. Poor control over an ATRP process may also, be addressed, by changing the catalyst to one that provides the ATRP redox equilibrium for the desired monomers.

The formation of a hydrophobic "macroinitiator" may also be addressed by initiating an microemulsion polymerization prior to adding the second monomer(s), see FIG. 1B.

An ab-initio emulsion ATRP was thereby successfully constructed for controlled ATRP of styrene, acrylates and methacrylates.

Figure 7:
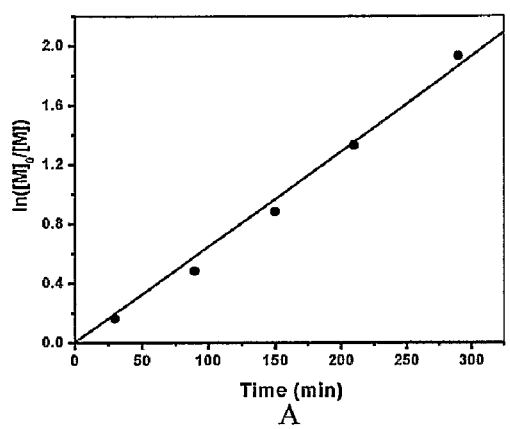
FIG. 7 shows various kinetic plots of data gathered from embodiments of a ab initio emulsion AGET ATRP process is which (A) is a first order kinetic plot and (B) displays the molecular weight evolution with monomer conversion for polymerization of butyl acrylate.
Figure 7:
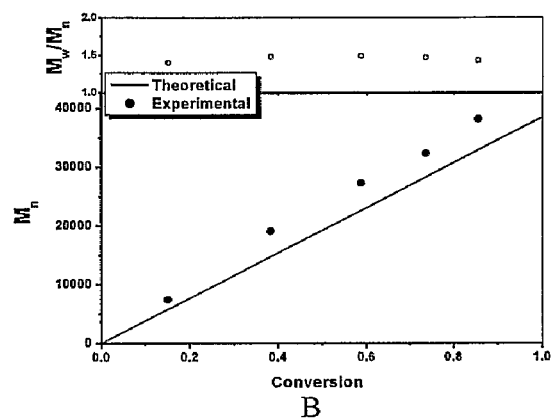

In this initial set of exemplary experiments the degree of polymerization (DP) for the microemulsion polymerization step was set at 100, while the DP when the second polymerization monomer (BA) that was targeted for incorporation into the polymer in the ab-initio emulsion was 200. After the addition of the second monomer, the concentration of radicals was constant, as evidenced by a linear first order kinetic plot, FIG. 7A. The degree of control over this ab-initio emulsion ATRP was confirmed by continuous increase in molecular weight with conversion and the narrow molecular weight distribution of the polymers obtained, FIG. 7B. The experi-

TABLE 3 ab-initio emulsion ATRP

| Run | Monomer | T | [M1]:[M2]:[EbiB]:[Cu]:[L]:[RA] | [Surf]/[M] | % Solids |
|---|---|---|---|---|---|
| KM457 | MMA | 70 | 50:200:1:0.4:0.4:0.28 | 0.42 | 19% |
| KM460/461 | BA | 80 | 50:200:1:0.4:0.4:0.4/0.8:0.16 | 0.38 | 19% |
| KM462 | Styrene | 80 | 50:200:1:0.4:0.8:0.16 | 0.44 | 18% |
| KM466 | | | 50:200:1:0.4:0.8:0.16 | 0.22 | 16% |
| KM468 | | | 15:200:1:0.3:0.45:0.12 | 0.057 | 22% |

The fact that a true emulsion polymerization had occurred was initially confirmed by the final particle size of the stable emulsion. The particles in Experiment KM 462 were ~120 nm; in Experiment KM 466 they were ~190 nm and in Experiment KM 468 they were 300 nm i.e. the size of the micelles increased as monomer diffused into the micelles and was controllably polymerized. Solid content was 14% in Experiment KM 462 and KM 466 and 20% in run 468 and surfactant mental molecular weights were in good agreement with the predicted values (FIG. 7B), indicating high initiation efficiency (over 90%). The initiation efficiency was comparable to that from a microemulsion ATRP, which qualitatively proves that no new chains were generated after the addition of the second batch of monomer. High monomer conversion, 87%, was obtained after 5 hours. The final latex was stable with particle size ~90 nm.

The initial embodiments of ab-initio emulsion ATRP processes used a relatively high surfactant concentration (~75% of the monomer added to the microemulsion). The surfactant remains in the latex and may affect the cost and properties of the polymer product. Presently, commercial latex products prepared by other emulsion polymerization processes, surfactant concentrations are normally in the range of 1-6% by weight of surfactant to monomer. The surfactant concentration may be higher if a non-ionic surfactant is used. The surfactant concentration to use in the initial experiments was primarily determined by the amount of first monomer, i.e. the microemulsion ATRP process step. A stable microemulsion will not be formed until the ratio of monomer and surfactant reaches a critical value. A certain amount surfactant can only solubilize a limited amount of a specific monomer. In order to reduce the final surfactant concentration, the amount of monomer in the first step, i.e. the microemulsion ATRP process step, may be decreased to such an amount that all of the added monomer may be fully solubilized by the reduced amount of surfactant. According to our experiments, 1 g of Brij 98 surfactant (in 20 mL aqueous solution) can successfully solubilize 0.5 g butyl acrylate. However, reducing the amount of monomer introduces another problem: solid catalysts only have certain degree of solubility in the monomer, therefore, the desired amount of catalyst may not be able to dissolve in a reduced amount monomer. For instance, if the amount of monomer in the microemulsion ATRP is decreased by 50% (targeting a DP=50), then the weight of catalysts employed in these first exemplary experiments cannot completely dissolve in such a small amount of monomer.

In some embodiments, highly efficient ATRP catalysts may be used to significantly decrease the concentration of the catalysts in the micelle. Various embodiments of miniemulsion ATRP processes comprising, catalyst concentrations of only one fifth of the molar amount of initiator. In embodiments of the present invention, the amount of catalyst may be reduced to 15% of the molar ratio of initiator. Consequently, in such embodiments the catalyst may be dissolved completely in the amount of monomer required to target a DP of 15. In such an embodiment, an optically clear stable microemulsion was formed with a reduced amount of surfactant. Additional monomer, sufficient for a final DP of 210, was added to the reaction after the microemulsion polymerization was initiated by addition of a reducing agent. A linear first order kinetic plot was attained, indicating a controlled polymerization. Monomer conversion reached ~80% after 6 hours and the molecular weights were close to the predicted values. High initiation efficiency, ~90%, was obtained. Consequently, by reducing the amount of catalysts and the amount of monomer added to the initial microemulsion ATRP process, the surfactant concentration was dramatically decreased to only 12% of the monomer added in the final ab-initio emulsion. At the same time, the solid content of the emulsion was increased to 20%. This reduction in the concentration of catalyst and surfactant are significant steps forward towards making the ab-initio emulsion ATRP practical for many applications. In other embodiments, the surfactant may be within 12% of monomers.

The surfactant concentration can further be decreased, simply by increasing the targeted DP of the second batch of monomer(s), for example. The DPs for the two stages of the ab-initio emulsion polymerization were set as 15 and 285, respectively. In this way the surfactant concentration was further reduced to 9.5% of the weight of monomer and the solid content was increased to 26%. The obtained polymeric latex was stable with the latex particle size of 120 nm and narrow size distributions. Further increases in the final DP can be made with the only cost for lower concentration of surfactant being a lower rate of polymerization since a lower concentration is present.

We have therefore demonstrated that a fully controlled ATRP can be successfully conducted in an ab-initio emulsion system while employing a commercially acceptable surfactant concentration.

Figure 8:
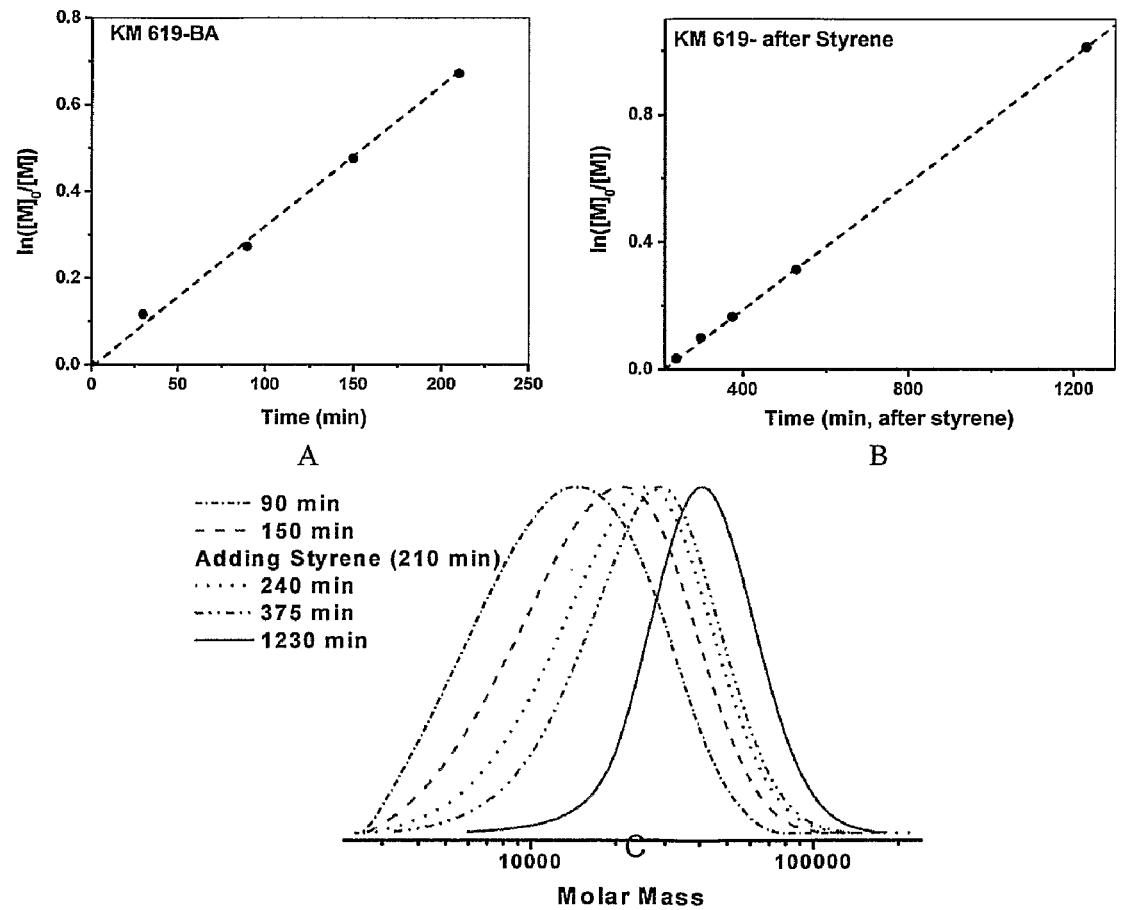
FIG. 8 shows various kinetic plots of data gathered from embodiments of a ab initio emulsion AGET ATRP process is which (A) is the first-order kinetic plot for polymerization of butyl acrylate followed by chain extension with styrene as shown in (B) by adding styrene in-situ after 210 minutes in an ab-initio emulsion wherein the concentrations of components is [BA]:[St]:[EBiB]:[CuBr$_2$/BPMODA]:[ascorbic acid]= 160:140:1:0.2:0.008 and the concentration of surfactant [Brij 98] is 9.5% based on weight of the monomer, the solid content is 26% (based on 100% conversion); and (C) shows the GPC traces of polybutyl acrylate and poly butyl acrylate-co-styrene before and after the addition of styrene to the polymerization.
Figure 9:
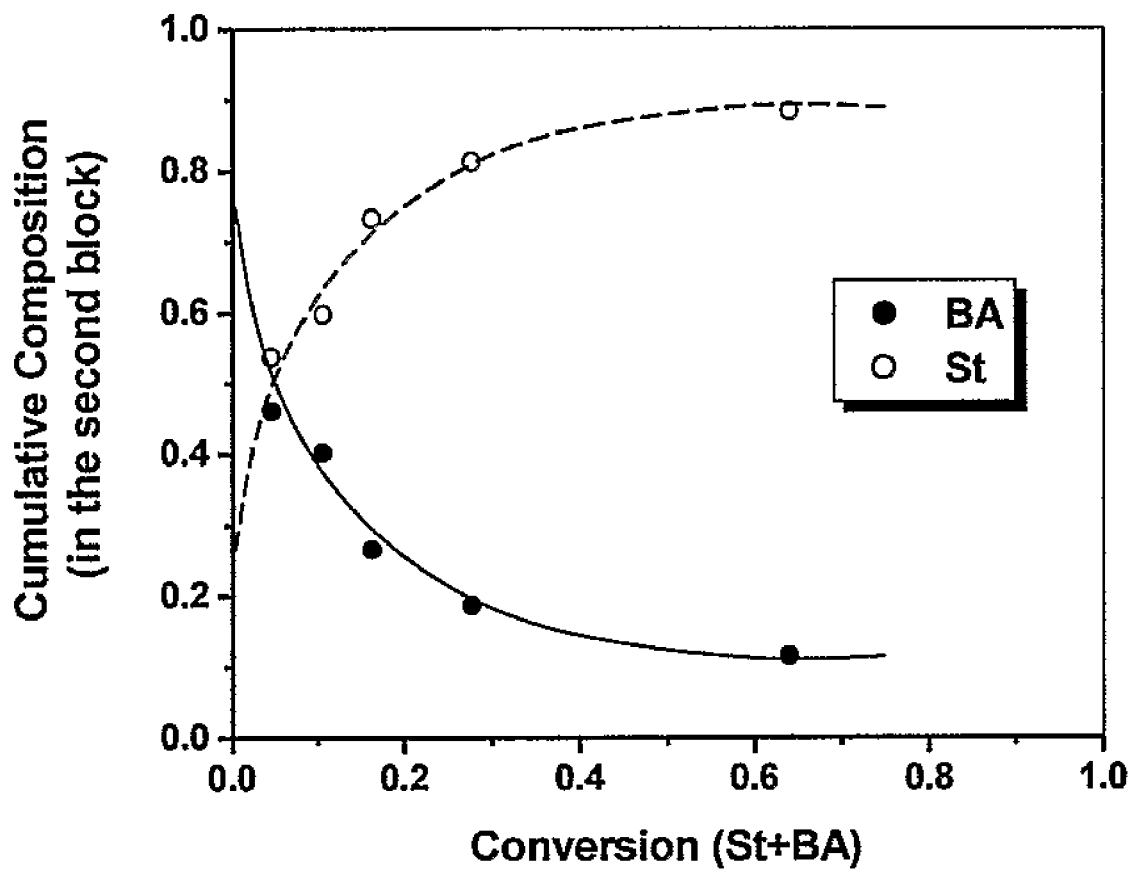
FIG. 9 is a graph of the cumulative composition of a polymer formed by an embodiment of the a microemulsion ATRP process comprising butyl acrylate and styrene, wherein styrene is in the second block of the copolymer.

In order to verify that a microemulsion ATRP process is a living polymerization, an embodiment of the ab-initio emulsion ATRP polymerization comprising adding a different monomer, for example styrene (St) to an active butyl acrylate (BA) emulsion ATRP process was conducted. The polyBA formed in the first emulsion polymerization was a macroinitiator for the polymerization of remaining BA and the added St. Therefore, the final polymer was a block copolymer containing a p(BA) homopolymer A block and second B block consisting of a (BA-g-St) gradient copolymer. The results showed that polymerization was controlled before and after styrene addition, as evidenced by two linear first order kinetic plots (FIGS. 8A and 8B). However, the slopes of the two kinetic plots are different, which is attributed to dilution of the radical concentration after the addition of St. The GPC curves of polymer samples (FIG. 8C) obtained from the continuous emulsion block copolymerization symmetrically moved toward higher molecular weight, indicating that no new polymer chains were formed after the addition of St monomer and that all poly(butyl acrylate) macroinitiators were successfully chain extended. The polymer composition was analyzed by $^1$HNMR and suggests that a smooth gradient copolymer was formed in the second block. The polymer composition of the second block is shown in FIG. 9, indicating a BA-rich polymer head and a St-rich polymer tail, which corresponds with the differences in monomer concentration and the difference in reactivity ratio between these two monomers.

Further, embodiments of the processes of present invention may be used to prepare novel block copolymers. Embodiments of the block copolymers may include a block copolymer for use in a paint or coating comprising a first block of monomer that preferentially attaches to the surface to be coated and a second block that comprises monomers with the desired physical or chemical properties. For example, the first block may include monomers that may attach to plastics, metals, papers, ceramics, or another coating, while the second block has the desired chemical corrosion resistance, hardness, durability, or nonstick surface.

Therefore ATRP has been successfully applied to an ab-initio emulsion polymerization using a continuous "two-step" procedure, in which the ab-initio emulsion is formed by adding monomer to an ongoing or completed microemulsion ATRP. This procedure avoids the need to transport catalysts through the aqueous media during the polymerization and therefore facilitates a controlled ATRP polymerization in the active micelles. The surfactant concentration was efficiently decreased by changing the ratio of the monomer added to the microemulsion stage compared to the amount of monomer added afterwards to form the ab-initio emulsion.

The extensive discussions of the procedures that led to the development of this ab-initio emulsion ATRP disclosed herein are meant to edify the process variables that had to be considered in order to develop a true efficient ab-initio ATRP emulsion system and therefore the few examples of the successful exemplification of this novel concept discussed below are not meant to limit the application of the disclosed process to the exemplifying monomers with exemplifying catalyst complexes under the exemplifying conditions. When the factors are considered by one skilled in the art the disclosed process can be applied to a full range of radically copolymerizable monomers employing mono-di and multifunctional ATRP initiators for synthesis of stable emulsion systems comprising materials of controlled topology, functionality and composition.

EXAMPLES

Materials: Monomers were purified by passing through a column filled with basic aluminum oxide (Sorbent technologies) to remove inhibitor, or antioxidant, in order to provide consistent reaction kinetics in the presence of oxygen. The purified monomers were stored at −5° C. Bis(2-pyridylmethyl) octadecylamine (BPMODA) was synthesized according to the procedures previously published. CuBr (98%, Aldrich) was purified by sequentially washing with acetic acid and isopropanol and drying under vacuum. $CuBr_2$ (99.999%, Aldrich), ethyl 2-bromoisobutyrate (EBiB, 98%, Aldrich), Brij 98 (polyoxyethylene(20) oleyl ether, Aldrich), 2,2'-azobis(2-amidinopropane) dihydrochloride (V-50, Wako Chemicals), L(+)-ascorbic acid (Aldrich) and Dowex MSC-1 macroporous ion-exchange resin (20-50 mesh, Aldrich) were used without further purification.

Measurements: Monomer conversion was gravimetrically measured. Molecular weight was measured by Gel Permeation Chromatography (GPC) equipped with an autosampler (Waters, 717 plus), HPLC pump at 1 mL/min (Waters, 515), and four columns (guard, $10^5$ Å, $10^3$ Å and $10^2$ Å; Polymer Standards Services) in series. Toluene was used as an internal standard. A calibration curve based on linear poly(methyl methacrylate) or polystyrene standards was used in conjunction with a differential refractometer (Waters, 2410). The latex size and size distribution were measured by dynamic light scattering on High Performance Particle Sizer, Model HP5001 from Malvern Instruments, Ltd. Transmission Electron Microscopy (TEM) analysis was performed on Hitachi H-7100 Transmission Electron Microscope. Considering the small latex size, phosphotungstic acid (PTA) negative staining was used. About 100 individual particle diameters were measured from TEM images to obtain a representative particle size and size distribution.

Example 1

Ab-Initio Emulsion ATRP (Results Reported in Table 2)

Conventional Microemulsion Polymerization: MMA was added to an aqueous solution of Brij 98 in a Schlenk flask under stirring to form the microemulsion. After the microemulsion was bubbled with nitrogen for 30 minutes, the flask and its contents were heated to 65° C. before an aqueous solution of V-50 was added to initiate polymerization.

Normal ATRP in Microemulsion: CuBr and BPMODA were charged into Schlenk flask and flushed with nitrogen. Deoxygenated monomer MMA was injected into the flask and stirred at 60° C. with the catalyst precursors until the Cu(II) complex was formed. Deoxygenated aqueous solution of Brij 98 was added into the flask and the contents stirred until a transparent microemulsion was formed. The flask was heated to 65° C. and the polymerization initiated by the injection of deoxygenated EBiB.

Reverse ATRP in Microemulsion: Before conducting a microemulsion polymerization, the Cu(II) complex was prepared by dissolving $CuBr_2$ and BPMODA in MMA at 60° C. The resulting solution was slowly injected into an aqueous solution of Brij 98 at room temperature to form a microemulsion before the mixture was purged with argon for 30 minutes. The flask was then immersed in an oil bath thermostated to 65° C. An aqueous solution of V-50 was injected into the flask to initiate the polymerization. The final sample was dried in vacuum oven, dissolved in THF for molecular weight measurement.

AGET ATRP in Microemulsion: The Cu(II) complex was prepared using the same procedure as above. The EBiB initiator was then dissolved in this complex. The resulting solution was slowly injected into the aqueous solution of Brij 98 to form a microemulsion before the mixture was purged with argon for 30 minutes. The flask was then immersed in an oil bath thermostated at designed temperature (65° C. for MMA, 80° C. for styrene). An aqueous solution of ascorbic acid was injected into the reaction to reduce the catalyst complex to Cu(I) and thereafter allow the activated catalyst initiate the polymerization. The final sample was dried in vacuum oven, dissolved in THF for molecular weight measurement.

Forced Gradient Copolymers by ATRP in a Miniemulsion: In order to demonstrate that monomers can be transported across the aqueous suspending phase a forced gradient miniemulsion copolymerization was conducted. AGET is advantageous in preparation of forced gradient copolymers in aqueous dispersed media, e.g. miniemulsion, since the dispersion/suspension can be formed with the catalyst complex in the deactivator (Cu(II)) state.

TABLE 4

Run Conditions:

| | $[M1]_0$:$[M2]_{total}$:[EBiB]$_0$:[Cu(II)]$_0$:[Ascorbic acid] | M1 | tBA Feed rate |
|---|---|---|---|
| KM 440 | 100:100:1:0.4:0.18 | nBA | 0.01 mL/min after 30 min |
| KM 470 | 100:100:1:0.4:0.18 | nBA | 0.01 mL/min |
| KM 498 | 100:100:1:0.4:0.18 | nBA | 0.015 mL/min (60 min) 0.01 mL/min (60 min) 0.005 mL/min (120 min) |
| KM 499 | 100:100:1:0.4:0.18 | tBA | 0.01 mL/min |

In order to obtain a gradient copolymer, the proper choice of monomer is one obvious key issue, however, the feed rate also affects the gradient shapes. In run KM440, tBA was fed into the system after 30 minutes in order to allow sufficient time to overcome the induction period and allow the reaction to initiate. It was assumed that there was an induction period for the polymerization of nBA. However, as the black curve (FIG. 5) indicated, nBA was quickly incorporated into the growing polymer chains. From the conversion data, at 30 minutes the conversion of nBA was already 18%. This means tBA had no chance to be incorporated into the polymer immediately after initiation. The instantaneous curve also indicates that this gradient copolymer was very similar to a block copolymer; before total conversion approached 50%, polymer chains primarily consisted of nBA monomer segments, which resulted in a relatively sharp change when nBA was consumed. Therefore, in run KM 470, the monomer tBA was added to the system at the time of initiation of polymerization (red curves). It can be clearly seen that tBA monomer began to diffuse into the monomer droplets and was efficiently incorporated into the ongoing polymerization. However, from the instantaneous composition vs. conversion figure, one can tell that the concentration of tBA was not particularly high at the beginning because the instantaneous composition of tBA in the growing polymer chain increased very slowly as the polymerization progressed. However, if the feed rate is too fast, under the same temperature, the system may behave as a random copolymerization. Therefore, a gradient in addition rates was selected for run KM498; tBA was fed into the miniemulsion system at a rate of 0.015 mL/min for the initial 60 minutes which was reduced to 0.01 mL/min for the following 60 minutes and finally a rate of 0.005 mL/min for the following 120 minutes. The figure suggested that the composition of the final copolymer showed a smooth gradient in instantaneous composition along the copolymer backbone. Together these examples of different shaped gradient copolymers show that monomers can diffuse across the aqueous phase and further the rate of addition of monomer(s) can be adjusted to control the rate of incorporation of monomer(s) into the growing polymer chain.

In run KM 499 tBA was added to the miniemulsion and nBA was used as the fed monomer. It was noticed that nBA diffused into the monomer droplets and participated into polymerization more efficiently than tBA. The feed rate in this reaction was set constantly at 0.01 mL/min. It was found that a graph of the polymer composition along the polymer chain showed a smooth shape. This would indicate that different monomers can diffuse at different rates and with appropriate comonomers a gradient could be constructed based solely on differences in diffusion rates from comonomer droplets.

Example II

Ab-Initio Emulsion Polymerization of Styrene

Anchoring the Initiator: ATRP in Microemulsion and Miniemulsion Resulted in Success To ensure that the catalyst substantially remains in the micelles an embodiment of the ab-initio emulsion ATRP process comprises using a highly hydrophobic ligand (BP-MODA, dNbpy, tNtpy). However, the potential for dissociation of the catalysts still exists and increases as the reaction temperature increases for any catalyst. For instance, the color of a miniemulsion before polymerization is activated, i.e. when only Cu(II) complexes reside inside the micelles changed from bluish from green when the miniemulsion was stirred at 80° C. for 5-10 minutes as a result of the copper (II) complex diffusing out of the micelles and undergoing disproportionation. Therefore, in certain embodiments the reducing agent, may be added to the reaction shortly after the (micro) emulsion is heated in order to reduce the deactivator complex within the micelles before they migrate to the aqueous phase and dissociate.

For styrene-related monomers, oligomer diffusion out of polymeric particle may result in a decreased initiation efficiency because the end functionality of the oligomer may be hydrolyzed. While in the case of (meth)acrylate(s), diffusion of the oligomer may result in uncontrolled polymerization because the polymerization in water would not be regulated by the ATRP catalyst.

One method to prevent oligomer/initiator diffusion is to use a macroinitiator, potentially a surfactant. The use of a simple PEO macroinitiator did not show good results, mostly because of the high solubility of PEO in aqueous phase, especially at high temperatures. A stable miniemulsion may be formed at room temperature but colloidal may be lost at 80° C. In order to overcome this limitation a PEO-based macroinitiator was designed to increase the hydrophobicity of the initiator. PEO-Br was used as an ATRP initiator to synthesize a PEO-ODMA block copolymer with an extremely short (1~2) ODMA segment. A similar approach was also taken to increase the hydrophobicity of ethylbromoisobutyrate which seemed to be small enough to diffuse out of the droplets, a similar but larger initiator, octyl bromoisobutyrate was designed.

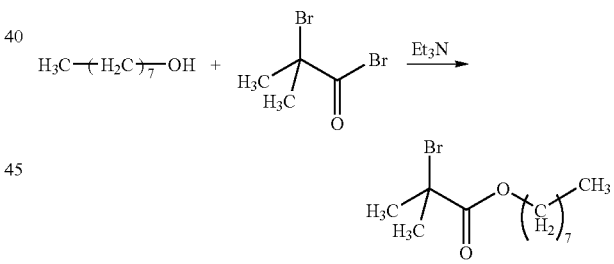

$^1$H NMR analysis showed that the product was pure. This initiator was used for the ATRP of BA in an ab-initio emulsion. (Run KM 531) The initiator was easily emulsified with BA monomer, and the final emulsion was very stable with the micelle size 100-200 nm. The final molecular weight distribution of such a process was around 1.5. The molecular weight increased to a high value at low monomer conversion with a high PDI. This result indicates that the initiator/oligomer still may have diffused out of the polymeric particles. It seems that the hydrophobicity of this OBiB is not sufficient to prevent diffusion.

A conventional emulsion polymerization starts with a combination of micelles and relatively large monomer droplets. The polymerization loci are usually considered to be inside the micelles (or polymeric particles). To mimic this situation and create an appropriate environment for ATRP, an embodiment of the ab-initio polymerization includes a two-stage emulsion polymerization, in which a microemulsion is formed followed by addition of the second monomer to the microemulsion system. In the initial examples, the microemulsion was formed and the reducing agent was added immediately before addition of the second part of the monomer(s). Therefore the newly formed oligomer may have diffused out of the microemulsion droplet and initiated uncontrolled polymerization in aqueous phase (because of lack of catalyst). In an embodiment of the microemulsion ATRP process the polymerization is initiated and the polymerization is allowed to progress for a certain period before addition of the second monomer. Then the in-situ formed macroinitiator should stay inside the micelles (or polymeric particles), and the second part of monomer can diffuse in the particles to incorporate the polymerization.

Ab-initio Emulsion Polymerization of Styrene: The Cu(II) complex was prepared by dissolving $CuBr_2$ and BPMODA in styrene (50 molar equivalents compared to initiator) at 60° C. The resulting solution was slowly injected into the aqueous solution of Brij 98 at room temperature to form a microemulsion. An additional aliquot of styrene (200 molar equivalents compared to the initiator) was added before the mixture was purged with argon for 30 minutes. An aqueous solution of ascorbic acid was injected into the reaction to initiate the polymerization. The final sample was dried in vacuum oven, dissolved in THF for molecular weight measurement.

TABLE 5

Run Conditions

| Run | Monomer | T | [M1]:[M2]:[EbiB]:[Cu]:[L]:[RA] | [Surf]/[M] | % Solids |
|---|---|---|---|---|---|
| KM 462 | Styrene | 80 | 50:200:1:0.4:0.8:0.16 | 0.44 | 18% |
| KM 466 | | | 50:200:1:0.4:0.8:0.16 | 0.22 | 16% |
| KM 468 | | | 15:200:1:0.3:0.45:0.12 | 0.057 | 22% |

The results reported in Table 3, and excerpted above, indicate that by adjusting the amount of monomer first added to the microemulsion one can reduce the amount of surfactant present in the final product.

Example III

Extension of Ab-Initio Emulsion ATRP to Other Monomers

Methyl Methacrylate: MMA has large solubility in water which makes it easy to form a microemulsion. The polymerization was activated prior to the addition of a second lot of monomer. The ratio of the two parts of monomer addition was set as 1:2. In the following trials the second part of MMA was added 30 minutes after the addition of ascorbic acid. Based on prior experience the microemulsion polymerization should have been finished after 30 minutes so that the macroinitiator cannot diffuse out of the small polymeric particles when the second portion of monomer was added.

Run KM 536 MMA(1):Surf=1:2, Add MMA(2) after 30 min. Reaction temp. 70° C.
EBiB:$CuBr_2$/BPMODA:ascorbic-acid:MMA(1):MMA(2)=1:0.5/0.6:0.2:50:200

Run KM 545 MMA(1):Surf=1:2, Add MMA(2) after 30 min. Reaction temp. 70° C.
EBiB:$CuBr_2$/BPMODA:ascorbic acid:MMA(1):MMA(2)= 1:1/1.5:0.4:200:400

The final emulsion showed very good stability after each of the above runs, with the final particle size of ~160 nm. It was observed that the second monomer was added to the ongoing microemulsion polymerization while little monomer remained in the micelles. By the time the microemulsion polymerization had finished it was likely that a significant amount of polymer chains had lost their terminal functionality and most of the Cu(II) species resided inside the aqueous phase. The loss of chain end functionality was inferred from the long tailing in the GPC traces and the lack of deactivators resulted in an uncontrolled polymerization as the reaction progressed. Embodiments of the Microemulsion ATRP processes were conducted at a lower temperature (60° C.) and a slower stir rate (200 rpm) in order to obtain a more easily reproducible microemulsion.

Run KM 547 (Microemulsion of MMA at 60° C.)
EBiB:$CuBr_2$/BPMODA:ascorbic acid:MMA=1:1/1.5:0.4:200. (MMA:Surf=1:2)

According to the GPC trace and conversion measurements it was found that polymerization reached ~50% conversion after approximately 5 min. The final molecular weight after 80% conversion deviated a bit from the theoretical values. Otherwise quite a few of the chains could have experienced coupling reactions and chain end functionality would be reduced. In the following two trials the second monomer was added 5-8 minutes after activation/initiation corresponding to ~50% conversion based on the results from the microemulsion polymerization. In both of the trials sodium bromide was added in order to diminish the dissociation of Cu(II) species. During these two reactions, the addition of NaBr didn't affect the stability of the emulsion. In the latter one a little bit of precipitation was found but the overall emulsion was OK.

Run KM 549 (60° C.)
EBiB:$CuBr_2$/BPMODA:ascorbic acid:MMA(1):MMA(2)= 1:1/1.5:0.4:200:400
(MMA(1):Surf=1:2, NaBr 0.01 M). Add MMA(2) after 8 min.

Figure 10:
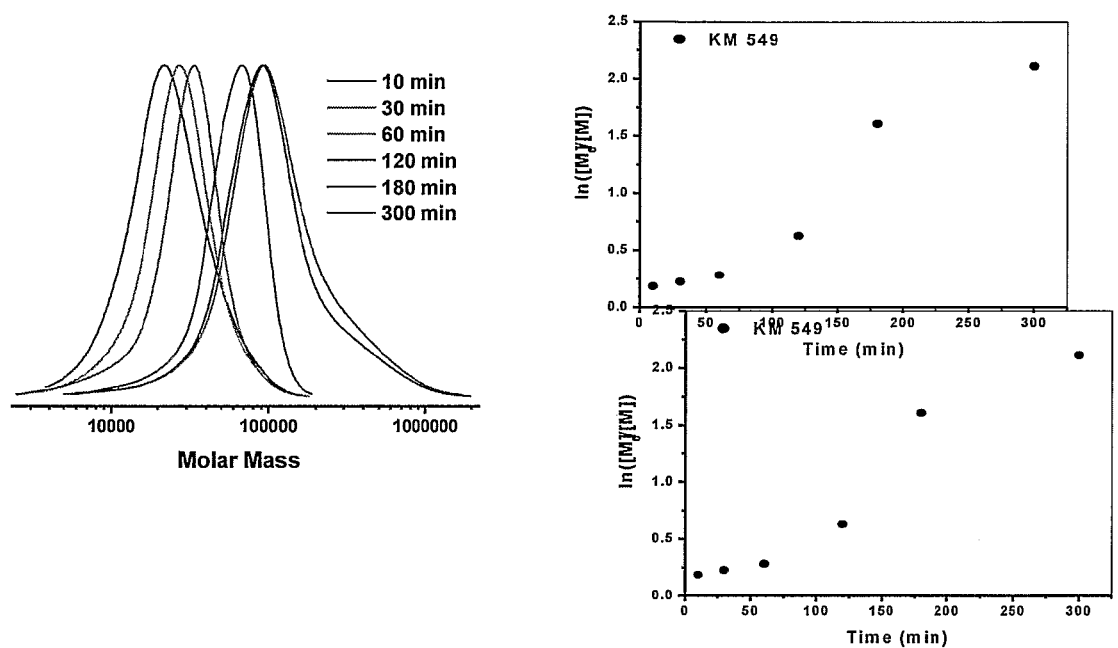
FIG. 10 shows various kinetic plots of data gathered from embodiments of an ab initio emulsion AGET ATRP process including GPC curves.
Figure 11:
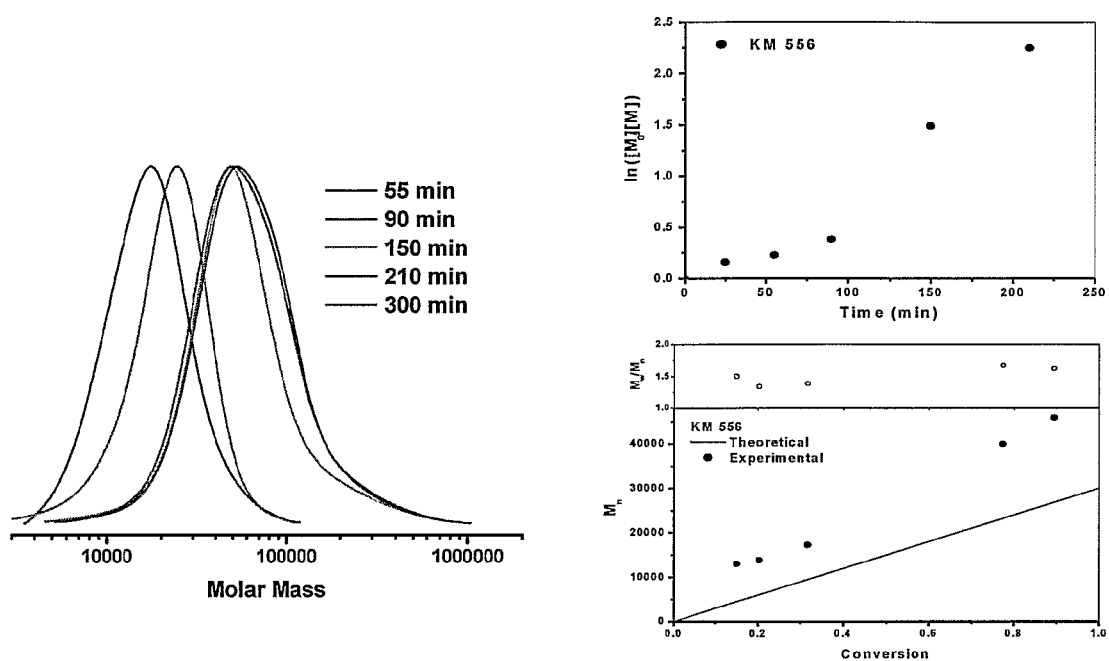
FIG. 11 shows various kinetic plots of data gathered from embodiments of an ab initio emulsion AGET ATRP process of methyl methacrylate.

The degree of control over the polymerization was improved when the second lot of monomer was added 5-8 minutes after the addition of the reducing agent, ascorbic acid. Despite the curved semi-logarithmic kinetic plot, the experimental molecular weight basically followed the theoretical values. (FIG. 10) Control over the polymerization appears to diminish as conversion increased above 50%. This behavior may be explained by a high Tg of pMMA and a relatively low reaction temperature (60° C.). The targeted DP was 600 so that the DP of the obtained polymer after 50% conversion was ~300 and the polymer solution displayed a glass state, meaning the polymer chain cannot fold/extend easily and catalyst diffusion is limited in the highly viscous system.

In order to decrease the effect from high Tg of pMMA, a lower targeted DP was designed. At the same time, sodium bromide was replaced by cetanyl trimethylamino bromide (CTAB). Since CTAB can not only provide additional bromide ion, but also can work as a surfactant, the emulsion should further retain its stability.

Note however that the results of this experiment point out one of the advantages of employing a reducing agent to activate an ATRP; namely the reducing agent can further be used to drive ATRA reactions and modify the end group of the first formed polymer. In co-pending patent application PCT/US05/007264 which incorporated U.S. Provisional Application No. 60/611,853 several high yield reactions were disclosed whereby the terminal functionality on a growing ATRP chain, or macroinitiator can be further functionalized and the transferable atom removed from the chain end in a single high yield reaction that can be driven to completion by addition of a small molecule and excess reducing agent to complete the coupling reaction. Therefore in one embodiment of the procedure when the polymerization of the monomer(s) is greater than 90% a small molecule comprising a functional group capable of reacting with a radical is added to the reaction in conjunction with an excess of a reducing agent whereby the polymer is capped by the added small molecule and the reaction is driven to completion by the added reducing agent thereby forming a stable functional material no longer comprising a radically transferable atom or group.

Run KM 556 (60° C.)
EBiB:CuBr$_2$/BPMODA:ascorbic acid:MMA(1):MMA(2)= 1:0.5/0.75:0.2:100:200
(MMA(1):Surf=1:2, CTAB 0.002 M). Add MMA(2) after 8 min.

The polymerization retained stability after adding CTAB and the molecular distribution was relatively narrow below 50% conversion.

Run KM 557 (Microemulsion of BA, 80° C.)
Butyl Acrylate was selected as monomer Tg of pBA is lower than 0° C. CTAB was added as a co-surfactant.
EBiB:CuBr$_2$/BPMODA:ascorbic acid:BA=1:0.5/0.75: 0.2:100; (BA:Surf=1:2, CTAB 0.01 M)

The microemulsion was very stable with particle size 40 nm. The molecular weight followed the theoretical values very well and displayed an acceptable PDI (~1.4), meaning a controlled polymerization had been conducted. Compared with MMA, BA polymerized relatively slowly at a higher temperature at 80° C. and ~50% conversion was achieved after 30 minutes. Therefore in the ab-initio emulsion trial, the second part of monomer can be added correspondingly later.

Figure 12:
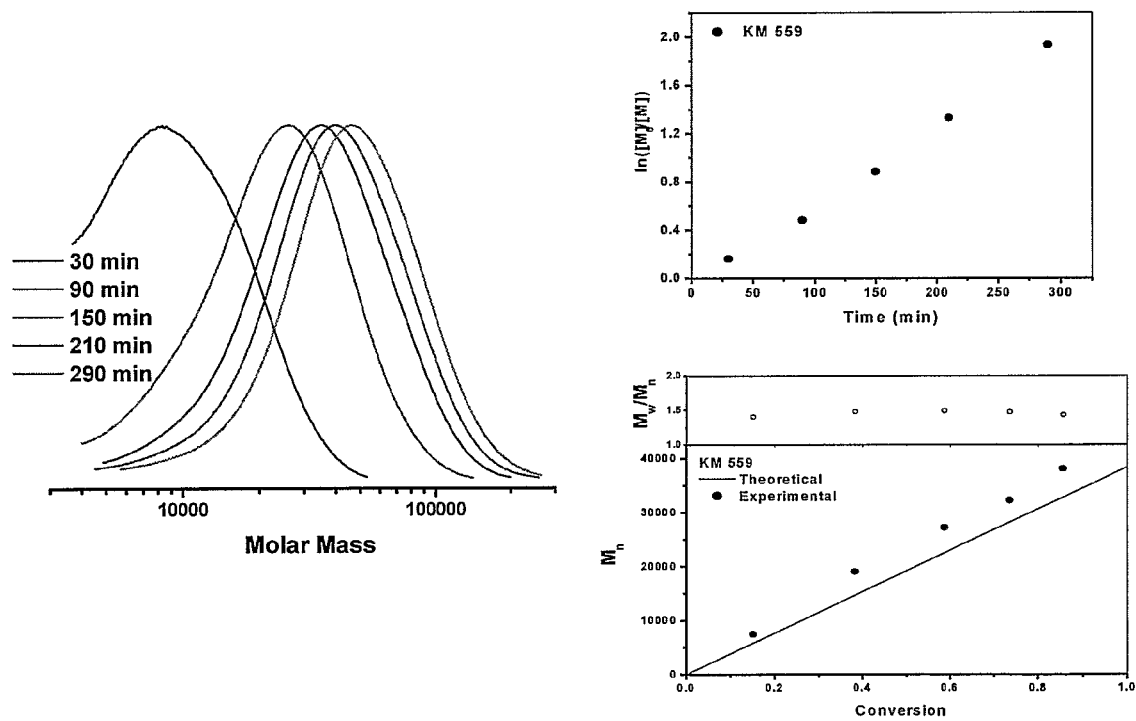
FIG. 12 shows various kinetic plots of data gathered from embodiments of an ab initio emulsion AGET ATRP process Kinetic plots and GPC curves for Run KM 559 comprising butyl acrylate.

Run KM 559 (ab-initio Emulsion Conducted at 80° C.)
EBiB:CuBr$_2$/BPMODA:ascorbic acid:BA(1):BA(2)=1: 0.5/0.75:0.2:100:200
(BA(1):Surf=1:2, CTAB 0.005 M)
Add BA(2) after 16 min As shown in FIG. 12 this polymerization can be considered to be a major success fully exemplifying the procedure. The linear semi-logarithmic kinetic plot indicates a constant radical concentration while the experimental molecular weight followed the theoretical target very well.

Example IV

Procedures to Reduce % Surfactant Employed

The target in this series of experiments was to significantly decrease the surfactant concentration. As shown above butyl acrylate can be controllably polymerized in this newly developed two-stage emulsion ATRP process with DP 220-300. The formation of a stable microemulsion requires a certain ratio of surfactant to monomer therefore it is important to decrease the absolute amount of monomer added to the first part of the two step procedure. Consequently, the amount of catalysts that can be added to the first part of the procedure also needs to be reduced, because catalysts, especially Cu(II) complexes have limited solubility in monomers.

An embodiment of the ab-inition polymerization process includes adding additional catalysts together with the second monomer. In such an embodiment, the catalysts would have to be transported across aqueous phase to the polymerizing particles and during this transportation, Cu(II) complexes may experience dissociation. For instance, in run KM 562 a certain amount of catalyst (0.6 mole ratio compared with initiator) was separately dissolved in the first and second part of the monomer (0.2 and 0.4 mole fraction respectively). This allowed the targeted DP to be decreased to 50 in the microemulsion process. However, when the second part of monomer (containing 66% of the catalyst) was added to the microemulsion, it was clearly observed that the monomer could not diffuse quickly into the small particles and for at least two hours after addition of the second part of the monomer a large green oil drop floated on the top of the system. The final "emulsion" was not stable. In spite of the instability, the molecular weight still increased steadily with conversion and the MWD was also acceptable (PDI=1.3). No additional catalyst was added to run KM 563. In the first part, the microemulsion stage the target DP was decreased to 20, allowing for a decrease in the amount of surfactant added to the system. After 9 hours the conversion reached ~100%. The final emulsion retained stability. The final PDI was 1.4.

During the microemulsion stage the amount of surfactant was the same as monomer. The microemulsion formation was difficult because of insufficient surfactant and while longer time and heating was helpful in providing a microemulsion the stability of the final emulsion was significantly affected. All the emulsions (using such conditions with [surf]/[BA(1)]= 1/1) showed different levels of instability. Precipitation occurred, or large particle sizes (>500 nm) were detected, and the resulting emulsion did not show a typical blue shade arising from light diffraction from uniform micelles. The reason was initially surmised to be the addition of sodium bromide or CTAB to the system however the polymerization ended up with the same instability when no extra bromide was added. As usual, the kinetics and the molecular weight shift still showed the characteristics of a controlled polymerization, in spite of all the instabilities.

However, when the ratio of surfactant/monomer [surf]/[BA(1)] was 1:2, formation of the microemulsion was easier and a successful controlled polymerization was always conducted. In the following reactions, the ratio of [Surf]/[BA(1)] was fixed at 0.6/0.35. Therefore in order to decrease the amount of BA(1) further, the total amount of catalysts may be decreased. In some examples it was decreased to 0.15 relative to initiator. A microemulsion was easily formed and the final emulsion retained its stability.

To examine whether sodium bromide or CTAB affected the stability or control, three parallel experiments were carried out. The result was that no obvious instability was found when sodium bromide or CTAB was added. The control over polymerization remained at the same level. However, the polymerization was slower than that without any extra counter-ion addition, probably due to Cu(II) disproportionation in the aqueous phase. This indicates that as long as the initial microemulsion was stable, the resulting ab-initio emulsion was stable. The level of control was acceptable regardless of whether additional bromide ion added to reduce Cu(II) dissociation on the aqueous phase.

In the above experiments, the surfactant concentration was reduced to 2.3 wt %, which is typical of a normal emulsion polymerization. The solid content was 23% (assuming 100% conversion) and this solid content can be improved easily by adding more monomer after the microemulsion is formed or during or after the second lot of monomer has been polymerized. The only cost is a slower polymerization.

Run KM 574:
[Surf]/[BA(1)]=0.6/0.35; [surf]/[BA(total)]=0.6/7
[EBiB]:[Cu(II)]:[BA(1)]:[BA(2)]=1:0.15:15:285.

In this polymerization, the concentration of surfactant was 2.2% and the final solid content was 26 wt % (assuming 100%). The kinetic plots and GPC curves showed that a fully controlled polymerization had been conducted.

Example V

Proof of "Livingness" in an Ab-Initio Emulsion ATRP

A controlled polymerization may be successfully obtained in an ab-initio emulsion ATRP system. In order to prove the "livingness" of the polymerization, i.e. the retention of active chain end-functionality in the polymers generated in the disclosed ab-initio emulsion polymerization, synthesis of a block copolymer was targeted in this in-situ two step system, by adding a second monomer, styrene, to the active emulsion polymerization. The polyBA formed in the first ab-initio emulsion polymerization should function as a macroinitiator for the polymerization of remaining BA and the added styrene, if styrene is added to an ongoing emulsion ATRP. The final polymer would be a block copolymer containing a homopolymeric p(BA) A block and a second B block consisting of a (BA-g-St) gradient copolymer with the % BA in the second block depending on the conversion of BA when the styrene was added to the ongoing polymerization process.

Figure 13:
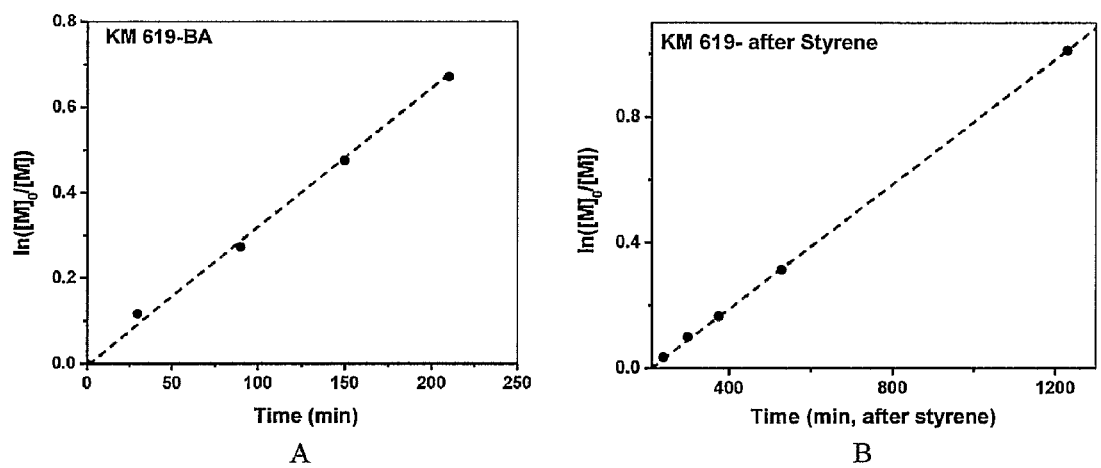
FIG. 13 shows various kinetic plots of data gathered from embodiments of an ab initio emulsion AGET ATRP process in which (A) is the first-order kinetic plot of the butyl acrylate polymerization and (B) is the first-order kinetic plot after adding styrene St in-situ after 210 minutes to an ongoing ab-initio emulsion, where the concentration of the components are [BA]:[St]:[EBiB]:[CuBr$_2$/BPMODA]:[ascorbic acid]=160:140:1:0.2:0.008 and the concentration of surfactant [Brij 98] is 9.5% based on monomer and the solid content is 26% (based on 100% conversion)
Figure 14:
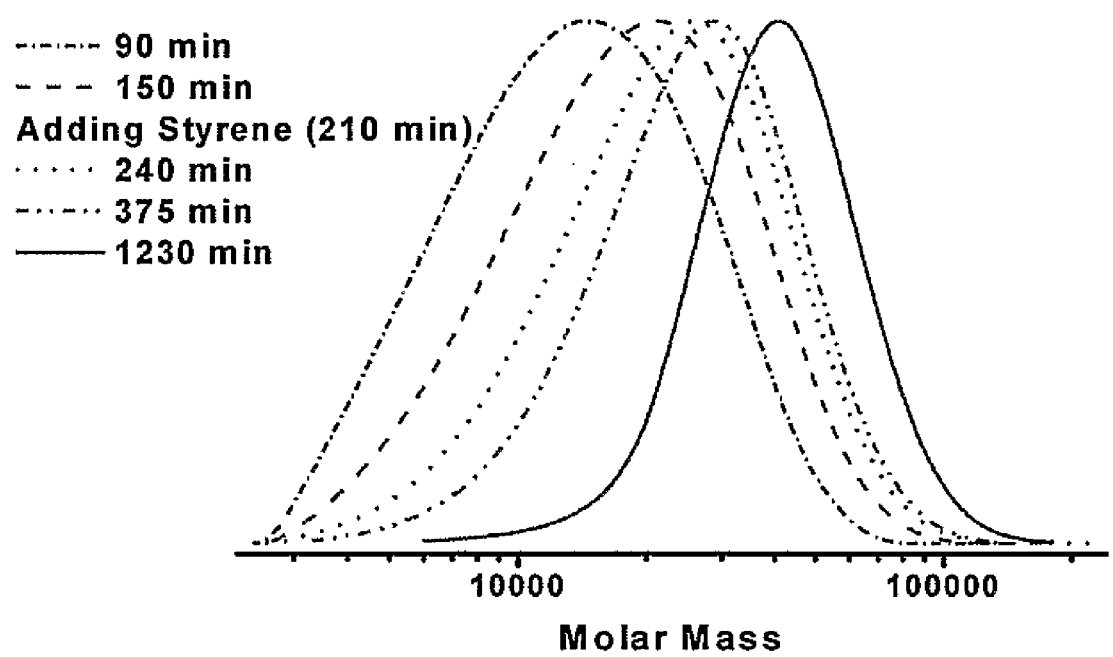
FIG. 14 are GPC traces of polybutyl acrylate and poly (butyl acrylate co styrene) samples before and after the addition of styrene in the embodiment of FIG. 13.
Figure 15:
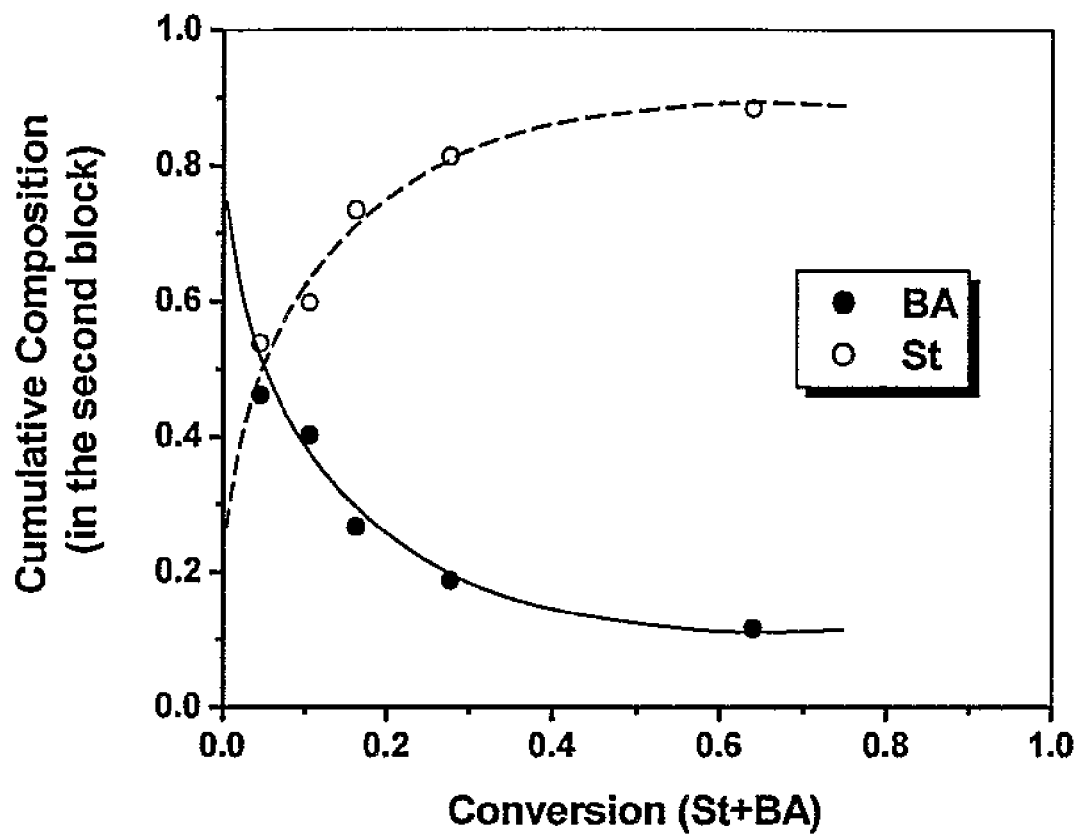
FIG. 15. is a graph of the cumulative compositions of butyl acrylate and styrene in the second block of copolymers (after addition of styrene) of the embodiment of FIGS. 13 and 14.
Figure 16:
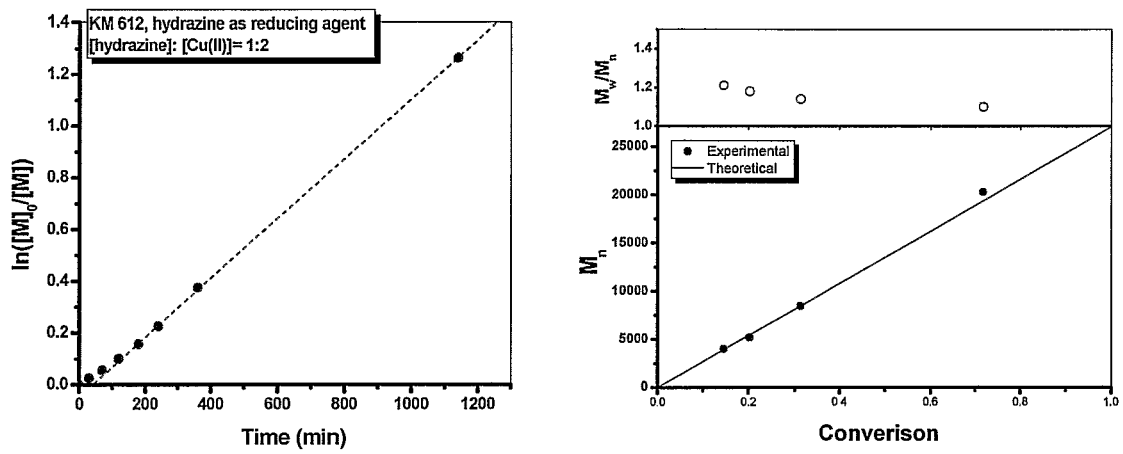
FIG. 16 displays graphs of the kinetic data and conversion graph for an embodiment of an ab-initio emulsion ATRP process activated by adding a reducing agent, wherein the reducing agent is hydrazine.

The polymerization was controlled before and after styrene addition, as evidenced by the two linear first order kinetic plots, FIG. 13. However, the slopes of the two kinetic plots are different, which can be attributed to a reduction in the absolute concentration of radicals after the addition of styrene. The GPC curves of polymers obtained from the continuous emulsion block copolymerization after styrene addition symmetrically moved toward higher molecular weight, FIG. 14, indicating that no new polymer chains were formed after the addition of the styrene monomer. The polyBA macroinitiators were successfully chain extended. This is the first example of a block copolymer being prepared in an ab-initio emulsion ATRP process. The polymer composition was analyzed by $^1$HNMR which suggested that a smooth gradient copolymer was formed in the second block. The polymer composition of the second block is shown in FIG. 15, indicating a BA-rich polymer head and a St-rich polymer tail, which corresponds with the differences in monomer concentration and the difference in reactivity ratio between these two monomers. This example proves that the ab-initio emulsion polymerization is indeed a "living" polymerization process and that all topological, compositional and functional materials prepared by ATRP techniques can now be prepared in aqueous dispersed emulsion systems.

Example VI

Examples of Alternative Reducing Agents

Other Reducing Agents for AGET ATRP in Bulk and Miniemulsion: Ascorbic acid is an environmentally acceptable reducing agent that sets up the correct ratio of Cu(I)/Cu(II). Other reducing agents were examined in order to show the broad applicability of the AGET ATRP initiating system. Hydrazine was also used as reducing agent in miniemulsion AGET ATRP.

The redox reaction is as follows:

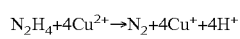

$$N_2H_4 + 4Cu^{2+} \rightarrow N_2 + 4Cu^+ + 4H^+$$

This indicates that an acid is generated by the reaction. However, because the reducing agent is basic, an excess of reducing agent hydrazine can help neutralize the environment. As observed, the color of the miniemulsion remained green for 20 hours, which means most of catalyst remained within the miniemulsion droplets.

Run KM 612 Hydrazine as Reducing Agent:
[BA]:[EBiB]:[CuBr$_2$/BPMODA]:[Hydrazine]=211:1:0.4: 0.2 (the amount of hydrazine added was 2 times the stoichiometric amount)

The polymerization was slower than a similar embodiment with ascorbic acid as the reducing agent. In the case of ascorbic acid, usually polymerization reached 70-80% conversion after 6 hours. In the case of hydrazine, the conversion only reached around 35% after 6 hours. However, the polymerization continued to display linear kinetics even after ~20 hours, which means the catalysts were safely protected inside miniemulsion droplets and there was no change in the concentration of active radical species throughout the entire reaction. These results prove that hydrazine is actually a suitable reducing agent for miniemulsion AGET ATRP particularly in light of the fact that the byproduct of the reduction reaction is nitrogen gas.

We also visually examined the kinetics of hydrazine reduction of Cu(II) complexes. Solutions of Cu(II)/TPMA were reduced by ascorbic acid and hydrazine in two side by side experiments. It was observed that hydrazine reduced Cu(II)/TPMA over a relatively long period; this reaction slowly reached equilibrium (the color was changing over a whole day) while the color of the ascorbic acid solution did not undergo any further change after several hours. This demonstration means, ascorbic acid reduced Cu(II) complexes quickly, however the equilibrium constant was relatively small while hydrazine reduced Cu(II) more completely (maybe because it is not a reversible equilibrium) but relatively slowly. Hydrazine may therefore act as a very good reducing agent for AGET ATRP in aqueous dispersed media. This can even be used to decrease the catalyst concentration in aqueous dispersed media because the diffusion of catalyst was suppressed. The slower rate of polymerization of the first monomers indicates that hydrazine would be a suitable reducing agent for fast polymerizing monomers such as MMA in a microemulsion allowing time for addition of a second monomer to an active polymerization.

Hydrazine was also successfully used as the reducing agent in a bulk ARGET ATRP of n-butyl acrylate (BA). The concentration of copper can be decreased to 50 ppm and a good control over polymerization was obtained. Indeed the experience gained in ARGET ATRP, where excess ligand is almost a requirement for a successful reaction indicates that various amines may act as reducing agents. According to a study in 1992, aliphatic amines are more efficient in reduction reactions compared with benzyl amine, while benzyl amine is much more efficient than picolyl amine. In short, Me$_6$TREN should be much more reducing than TPMA. However, according to a UV examination of the reduction of various Cu(II) complexes suitable as precursors for an ATRP, Me$_6$TREN doesn't reduce Cu(II)/Me$_6$TREN complex very efficiently. Compared to phenyl hydrazine, Me$_6$TREN is a weak reducing agent and the redox reaction quickly reached equilibrium with only very small amount of Cu(II)/Me$_6$TREN complexes reduced.

In the experiments with the same amount of ligand and reducing agent hydrazine, the polymerization with Me$_6$TREN was much faster than that with TPMA. However, at the comparable level of conversion, a better control over polymerization was obtained when TPMA was used as ligand.

AGET/ARGET ATRP of BA in Bulk with BHA as Reducing Agent:

In order to further extend the choices of reducing agent, butylated hydroxyanisole (BHA) and the related compound butylated hydroxytoluene (BHT), phenolic compounds that are often added to foods to preserve fats, which indicates they are relatively safe for an environmentally friendly ATRP, were examined. The AGET ATRP of butyl acrylate was successful in bulk using BHA as reducing agent with a mole ratio of [BA]:[EBiB]:[CuBr$_2$/PMDETA]:[BHA]=200:1:0.5:0.75

Fructose as reducing agent: Other reducing agents were examined to determine if the rate/extent of reduction of Cu(II) could be controlled by selection of appropriate agents particularly since glucose was successfully employed in ARGET ATRP of styrene in bulk. However when glucose was used in AGET ATRP in miniemulsion, no polymerization was detected. Glucose was therefore considered to be too weak a reducing agent and it was not appropriate for aqueous dispersed media. Fructose is a more reducing sugar than glucose therefore it may be a good reducing agent for aqueous dispersed media.

Fructose was initially attempted in a miniemulsion ATRP of BA. (Run KM 660: [BA]:[EBiB]:[CUBr$_2$/BPMODA]: [fructose]=300:1:0.3:0.25) According to the kinetic plot, the polymerization was very slow and after 8 hours the monomer conversion only reached 10.4%. The polymerization seemed to accelerate a little bit after that, and the monomer conversion increased to 34.8% after 21 hours. In spite of the very slow polymerization, the resulting polymer exhibited very narrow molecular weight distribution (M$_w$/M$_n$=1.16). Therefore fructose can be deemed as a suitable reducing agent for ATRP in aqueous dispersed media. It is probable that a larger amount of fructose should lead to a higher polymerization rate.

Figure 17:
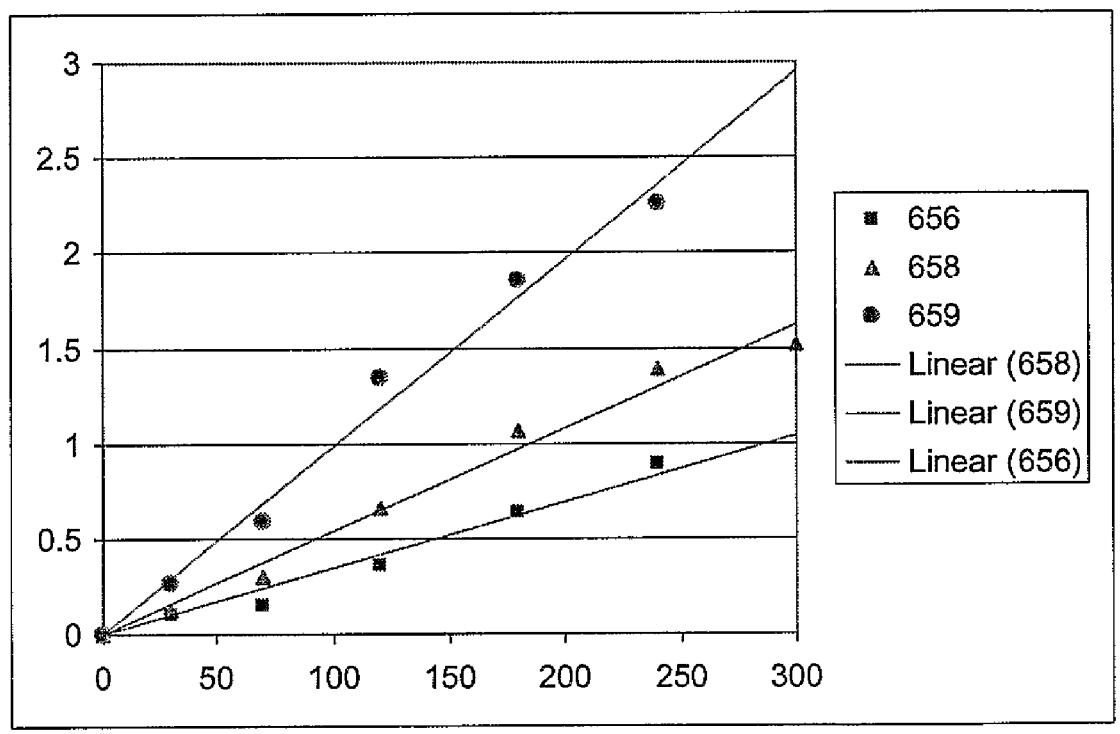
FIG. 17 is a graph of the kinetic data for a methyl methacrylate polymerization process with catalysts activated by different amounts of ascorbic acid as reducing agent.

Ab-initio Emulsion Polymerization of Methyl Methacrylate:

As noted in example III, the (co)polymerization of active monomers, i.e. those with a high k$_p$ and slow k$_{deact}$ such as MMA remains difficult since when there is a small amount of monomer in the first formed micelles there is little time between addition of reducing agent and addition of second lot of monomer if efficient use if initiator is desired. In example III this was addressed by lowering the reaction temperature however there are limitations inherent in this approach. Therefore the amount of ascorbic acid was adjusted from 33 mol-% of the Cu(II) down to 0.5 mol-% (as seen in Table 6). It was observed that all of the polymerizations were initiated quickly after the addition of ascorbic acid; usually 5 minutes after the ascorbic acid the microemulsion was observed to become translucent, indicating that the nucleation started. The colloidal stability was good, as evidenced by a 40-50 nm particle size and narrow particle size distribution. All of the polymerizations had a controlled rate according to the kinetic plots. (FIG. 17.) This means the polymerization rate can be adjusted by tuning the amount of reducing agent. This technique should very useful for an ab-initio emulsion polymerization because the polymerization rate can be modified so that all of the polymeric chains remain "living" before the addition of secondary monomer.

TABLE 6

Run conditions examining lower amounts of reducing agent.

| Run No. | MMA:Cu(II) | Ascorbic Acid | Ratio Cu:AA |
|---------|------------|---------------|-------------|
| KM 656  | 150:0.6    | 0.03          | 1:0.05      |
| KM 658  | 150:0.6    | 0.12          | 1:0.2       |
| KM 659  | 150:0.6    | 0.2           | 1:0.33      |

The low molecular weight polymer formed in these reactions had relatively low PDI and the GPC curves of the polymer samples taken at intervals throughout the reactions shifted towards higher MW as conversion increased. In short, addition of less ascorbic acid successfully decreased the polymerization rate which is the first step towards a successful ab-intio emulsion ATRP of methacrylate(s).

While reducing the amount of reducing agent added to the first formed microemulsion allows one to reduce the rate of propagation in the first formed micelles thereby creating a window of opportunity, or sufficient time, to add the second monomer(s) to an active living propagating p(MMA) chain the overall rate may be slower than desired for the second step. The rate of polymerization in the second step can be increased by addition of more reducing agent. This second addition of reducing agent can be the same reducing agent as the first addition or a different compound.

Fructose as Reducing Agent for Microemulsion ATRP of Methyl Methacrylate:

Ratio of reagents in run KM 663: [MMA]:[EBiB]:[CuBr$_2$/BPMODA]:[fructose]=150:1:0.6:0.5

Figure 18:
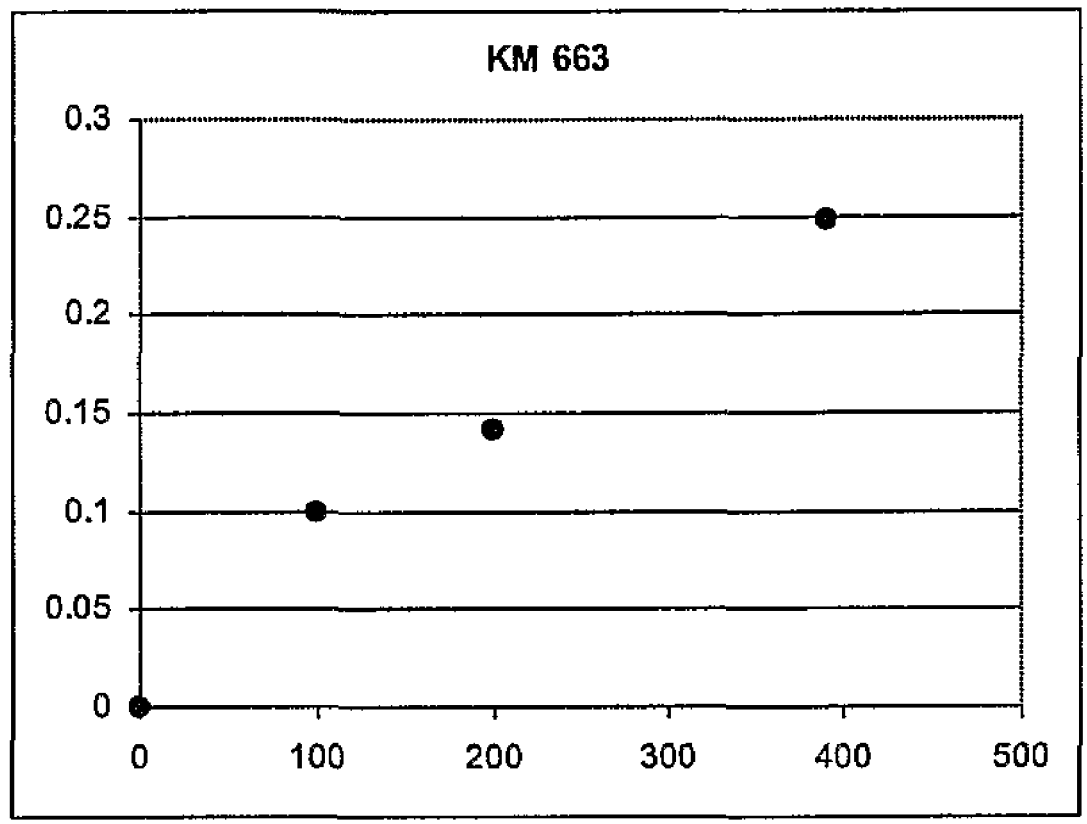
FIG. 18 is a graph of the kinetic data for run KM 663, an embodiment of a miniemulsion AGET ATRP process activated by adding a reducing agent, wherein the reducing agent is fructose.

As expected, the polymerization was very slow. The nucleation was observed at 70-80 min after injection of fructose. According to the kinetic plot, FIG. 18, the polymerization reached 22% conversion after 6.5 hours. The molecular weight exhibited a mono-modal peak in GPC traces. However the molecular weight was higher than expected and while it is still a promising option for ab-intio emulsion ATRP since the kinetic plot indicates the chains were living. Initiation efficiency may be a problem and a more active reducing agent or increased amount of fructose may have to be added for the first step.

In order to fully disclose and discuss how to conduct an ab-initio emulsion polymerization of free radically copolymerizable monomers using an ATRP we have methodically disclosed the steps that were examined to provide a solid understanding of the problems associated with a true emulsion ATRP and thereby enable such polymerizations. Therefore these examples are purely exemplary of the disclosed process and one knowledgeable in the art can apply the teachings to a broad spectrum of material synthesis.

The invention claimed is:

1. A microemulsion polymerization process, comprising:
    adding a polymerization catalyst precursor; initiator comprising a radically transferable atom or group, and an organic solvent to an aqueous solution comprising a surfactant to form an emulsion;
    adding first radically polymerizable monomers to the emulsion; and
    adding a reducing agent to convert the catalyst precursor to a catalyst for polymerization of the first monomer from the initiator, wherein the catalyst comprises a transition metal coordinated to a hydrophobic ligand.

2. The microemulsion polymerization process of claim 1, wherein the organic solvent comprises a second radically polymerizable monomer.

3. The microemulsion polymerization process of claim 1, wherein the organic solvent is a second radically polymerizable monomer.

4. The microemulsion polymerization process of claim 2, wherein the second radically polymerizable monomers are hydrophobic.

5. The microemulsion polymerization process of claim 1, further comprising adding second radically polymerizable monomers, wherein the step of adding the reducing agent is performed prior to the step of adding second monomers.

6. The microemulsion polymerization process of claim 1, further comprising adding second radically polymerizable monomers, wherein the step of adding the reducing agent is performed after the step of adding second monomers.

7. The microemulsion polymerization process of claim 1, wherein the catalyst precursor is a transition metal complex in a higher oxidation state.

8. The microemulsion polymerization process of claim 7, wherein the catalyst is a transition metal complex in a lower oxidation state.

9. The microemulsion polymerization process of claim 1, further comprising mixing the emulsion with additional monomer(s).

10. The microemulsion polymerization process of claim 1, wherein the reducing agent is at least one reducing agent selected from ascorbic acid, reducing sugars, fructose, lavonoids, quercetin, beta carotene, α-tocopherol, propyl gallate, octyl gallate, BHA or BHT, nitrites, propionic acids, sorbates, sulfites, SO$_2$, sulfites, bisulfites, thiosulfates, mercaptans, hydroxylamine, hydrazine, nitrites, substituted hydrazines, hydrazones, amines and substituted amines, phenols, enols, and non-acid forming viologens.

11. The microemulsion polymerization process of claim 1, wherein the surfactant is non-ionic.

12. The microemulsion polymerization process of claim 1, wherein the catalyst precursor is an atom transfer radical polymerization deactivator.

13. The microemulsion polymerization process of claim 1, wherein the reducing agent is water soluble.

14. The microemulsion polymerization process of claim 1, wherein the reducing agent will partition between both phases of the emulsion.

15. The microemulsion polymerization process of claim 1, wherein a molar ratio of surfactant to first monomer is less than 1.

16. The microemulsion polymerization process of claim 1, further comprising:
    adding a hydrophilic ligand.

17. The microemulsion polymerization process of claim 16, further comprising:
    contacting the emulsion with an ion exchange resin.

18. The microemulsion polymerization process of claim 1, wherein the emulsion comprises micelles with an average hydrodynamic diameter of less than 100 nm.

19. The microemulsion polymerization process of claim 18, wherein the micelle comprises the catalyst precursor, initiator, and organic solvent.

20. The microemulsion polymerization process of claim 1, wherein the emulsion comprises micelles with an average hydrodynamic diameter of less than 50 nm.

21. The microemulsion polymerization process of claim 1, wherein the aqueous solution comprises a salt.

22. The microemulsion polymerization process of claim 21, wherein the salt comprises a halide.

23. The microemulsion polymerization process of claim 1, wherein the organic solvent comprises a second radically polymerizable monomer and a ratio of surfactant to monomer is less than 1:3.

24. The microemulsion polymerization process of claim 1, wherein the ratio of surfactant to monomer is less than 1:10.

25. The microemulsion polymerization process of claim 1, wherein adding first radically polymerizable monomers to the emulsion comprises adding the first radically polymerizable monomers continuously or in stages to the polymerization process.

26. The microemulsion polymerization process of claim 1, wherein adding first radically polymerizable monomers to the emulsion comprises adding the first radically polymerizable monomers after 75 mol % of a second radically polymerizable monomer is consumed in the polymerization process.

27. The microemulsion polymerization process of claim 1, wherein the initiator comprises an additional functional group.

28. The microemulsion polymerization process of claim 1, wherein the initiator comprises more than one radically transferable atom or group.

29. The microemulsion polymerization process of claim 1, wherein the polymerization process forms an emulsion with a solids content of greater than 10%.

30. The microemulsion polymerization process of claim 29, wherein the emulsion has a solids content of greater than 20%.

31. The microemulsion polymerization process of claim 3, wherein the ratio of second radically polymerizable monomers to first radically polymerizable monomers is less that 1:1.

32. The microemulsion polymerization process of claim 3, wherein the ratio of second radically polymerizable monomers to first radically polymerizable monomers is less that 1:10.

33. A microemulsion polymerization process, comprising:
adding a polymerization catalyst precursor; radical initiator, and a monomer to an aqueous solution to form an emulsion;
adding a second monomer to the emulsion; and
forming radicals from the radical initiator to initiate the polymerization process.

34. The microemulsion polymerization process of claim 33, wherein the forming radicals is performed by raising the temperature of the emulsion or exposing the emulsion to ultraviolet light.

35. A microemulsion polymerization process, comprising:
adding a polymerization catalyst, an initiator comprising a radically transferable atom or group, and an organic solvent to an aqueous solution to form an emulsion; and
adding first radically polymerizable monomers to the emulsion.

36. An ab-initio emulsion ATRP polymerization process wherein a catalyst or catalyst precursor, an initiator and (co) monomers and optionally solvent, reside predominately in a first formed stable micelle and additional (co)monomer(s) reside in droplets and monomers diffuse from the droplets to the micelles as the polymerization progresses.

37. A microemulsion ATRP polymerization wherein a catalyst or catalyst precursor, an initiator and comonomers and optionally solvent reside predominately in a micelle with particle size less than 100 nm and the polymerization is initiated by addition of a reducing agent, and wherein the catalyst or catalyst precursor comprises a transition metal and a hydrophobic ligand.

38. The microemulsion polymerization process of claim 37 wherein additional comonomers are added to the reaction either prior to or after activation of the reaction by addition of the reducing agent.

39. The microemulsion polymerization process of claim 37, wherein additional comonomers are added to the reaction after activation of the reaction and a second reducing agent is added.

40. The microemulsion polymerization process of claim 38, wherein the aqueous suspension medium further comprises a halide containing salt.

41. The process of claim 36, wherein the first formed stable micelle comprises a ratio of surfactant to final monomer greater than 1:3.

42. The process of claim 41, wherein the first formed stable micelle comprises a ratio of surfactant to final monomer greater than 1:10.

43. The process of claim 37, wherein the reducing agent has a finite solubility in water.

44. The process of claim 43, wherein the reducing agent is a water soluble reducing agent.

45. The process of claim 43, wherein the reducing agent is ascorbic acid, a reducing sugar, a phenol, an enol, hydrazine or a substituted hydrazine, an amine or a substituted amine or other antioxidants.

46. The process of claim 36, wherein the catalyst or catalyst precursor comprises a transition metal and a hydrophobic ligand.

47. The process of claim 36, wherein the hydrodynamic diameter of the first formed stable micelle is smaller than 100 nm.

48. The process of claim 36, wherein the hydrodynamic diameter of the first formed stable micelle is smaller than 50 nm.

49. The process of claim 38, wherein the additional comonomers are added continuously or sequentially to the active polymerization process.

50. The process of claim 36, wherein the initiator comprises an additional functional group.

51. The process of claim 36, wherein the initiator comprises one or more ATRP initiating functional groups.

52. The process of claim 36, wherein the solids content of the final ab-initio emulsion is greater than 10%.

53. The process of claim 36, wherein the solids content of the final ab-initio emulsion is greater than 20%.

54. The process of claim 36, wherein the ratio of monomers added to the first formed micelles to the additional (co)monomer(s) forming the final ab-initio emulsion is greater than 1:1.

55. The process of claim 36, wherein the ratio of monomers added to the first formed micelles to the additional (co)monomer(s) forming the final ab-initio emulsion is greater than 1:10.

56. The process of claim 36, wherein the final ab-initio emulsion is exposed to an ion exchange resin to remove the catalyst complex from the latex.

57. A process for conducting a microemulsion ATRP wherein a catalyst precursor comprising a transition metal, a hydrophobic ligand, and an ATRP initiator comprising one or more radically transferable atoms or groups reside in a stable micelle formed by addition of a solution of the catalyst complex and the ATRP initiator and one or more monomers to an aqueous solution of a surfactant and the catalyst is activated by addition of a water soluble reducing agent thereby initiating the polymerization.

58. A process for the preparation of gradient copolymers comprising the continuous ab-initio emulsion ATRP polymerization process of claim 36, wherein a second different monomer is added to the ongoing reaction after the reaction has been initiated.

59. A process for the preparation of block copolymers comprising the continuous ab-initio emulsion ATRP polymerization process of claim 36, wherein a second different monomer is added to the ongoing reaction after more than 75% of the first additional (co)monomer(s) have been consumed.

60. A microemulsion ATRP process, comprising:
forming an emulsion comprising a transition metal catalyst in a lower oxidation state and radically polymerizable monomers in an aqueous solution, wherein the aqueous solution comprises water and surfactant; and
adding an ATRP initiator to the emulsion,
wherein the transition metal catalyst comprises a hydrophobic ligand.

61. The process of claim 30, wherein the ATRP initiator is hydrophobic.

62. A microemulsion ATRP process, comprising:
forming an emulsion comprising a transition metal catalyst in a higher oxidation state and radically polymerizable monomers in an aqueous solution, wherein the aqueous solution comprises water and surfactant; and
adding a conventional radical initiator to the emulsion,
wherein the transition metal catalyst comprises a hydrophobic ligand.

63. The process of claim 62, wherein the conventional radical initiator is hydrophobic.

* * * * *